US009250424B2

(12) United States Patent
Sugita

(10) Patent No.: US 9,250,424 B2
(45) Date of Patent: Feb. 2, 2016

(54) ZOOM LENS AND IMAGE-PICKUP APPARATUS

(71) Applicant: CANON KABUSHIKI KAISHA, Tokyo (JP)

(72) Inventor: Shigenobu Sugita, Shimotsuke (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 254 days.

(21) Appl. No.: 14/083,888

(22) Filed: Nov. 19, 2013

(65) Prior Publication Data
US 2014/0139722 A1 May 22, 2014

(30) Foreign Application Priority Data
Nov. 22, 2012 (JP) ................. 2012-256098

(51) Int. Cl.
G02B 15/16 (2006.01)
G02B 15/173 (2006.01)

(52) U.S. Cl.
CPC .............. G02B 15/16 (2013.01); G02B 15/173 (2013.01)

(58) Field of Classification Search
CPC ...................................... G02B 15/173
USPC ................. 359/687, 695, 683, 684
See application file for complete search history.

(56) References Cited

U.S. PATENT DOCUMENTS 6,061,186 A * 5/2000 Nishio ................. G02B 15/173 359/683
8,068,281 B2 11/2011 Adachi et al.
2001/0013978 A1* 8/2001 Mihara ................ G02B 15/177 359/680
2002/0063970 A1* 5/2002 Uzawa ................. G02B 15/173 359/689
2010/0157104 A1* 6/2010 Nagaoka .............. G02B 15/173 348/240.3
2011/0228158 A1* 9/2011 Imaoka ................ G02B 15/173 348/345
2012/0026600 A1* 2/2012 Matsumura .......... G02B 27/646 359/676
2012/0120501 A1 5/2012 Katayose et al.
2012/0154524 A1* 6/2012 Matsumura .......... G02B 15/173 348/36
2012/0257285 A1 10/2012 Kuzuhara et al.
2012/0262799 A1* 10/2012 Chou ................... G02B 15/173 359/684

(Continued)

FOREIGN PATENT DOCUMENTS
CN 102356344 A 2/2012
JP 11-202203 A 7/1999

(Continued)

OTHER PUBLICATIONS
Chinese Office Action issued in corresponding application No. CN201310593727.0 dated Sep. 2, 2015.

Primary Examiner — Roberto Velez
Assistant Examiner — Cynthia Segura
(74) Attorney, Agent, or Firm — Carter, DeLuca, Farrell & Schmidt, LLP

(57) ABSTRACT

A zoom lens includes a lens unit Lv positioned at the most object side of a plurality of lens units having the negative refractive power, a lens unit Lp positioned at the most object side of lens units having a positive refractive power, the lens units being positioned at an image side of the lens unit Lv, and lens units Fp and Fn respectively having a positive and a negative refractive power positioned at an image side of the lens unit Lp, the lens units Fp and Fn being configured to move during focusing. During focusing from infinity to minimum object distance, the lens unit Fp and the lens unit Fn move in the same direction in a wide angle range, and the lens unit Fp moves to an object side and the lens unit Fn moves to an image side in a telephoto range.

19 Claims, 19 Drawing Sheets

(56) References Cited

U.S. PATENT DOCUMENTS

| | | | |
|---|---|---|---|
| 2012/0268830 A1* | 10/2012 | Chou | G02B 15/173 359/683 |
| 2013/0033621 A1* | 2/2013 | Maruyama | G02B 15/173 348/240.3 |
| 2013/0093940 A1* | 4/2013 | Matsumura | G02B 15/173 348/345 |
| 2015/0146044 A1* | 5/2015 | Sugita | G02B 15/14 348/240.3 |

FOREIGN PATENT DOCUMENTS

| | | |
|---|---|---|
| JP | 2000-047107 A | 2/2000 |
| JP | 2004-318097 A | 11/2004 |
| JP | 2009-265652 A | 11/2009 |

\* cited by examiner

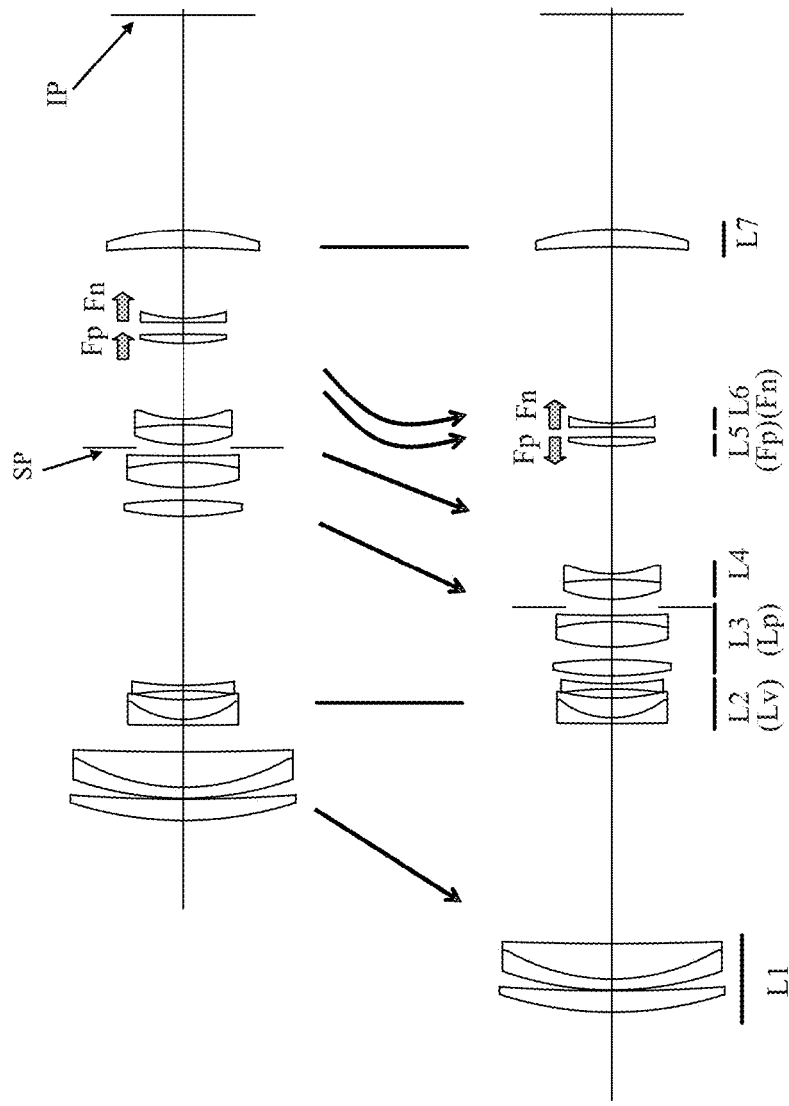

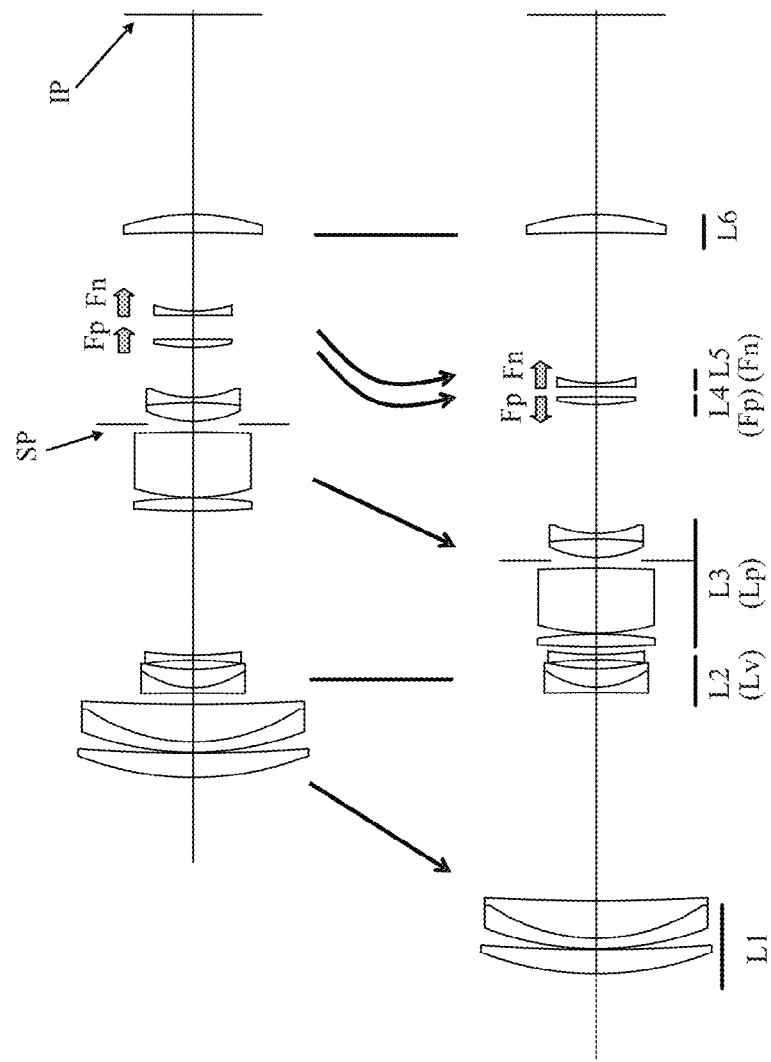
FIG. 4A WIDE ANGLE END
FIG. 4B TELEPHOTO END

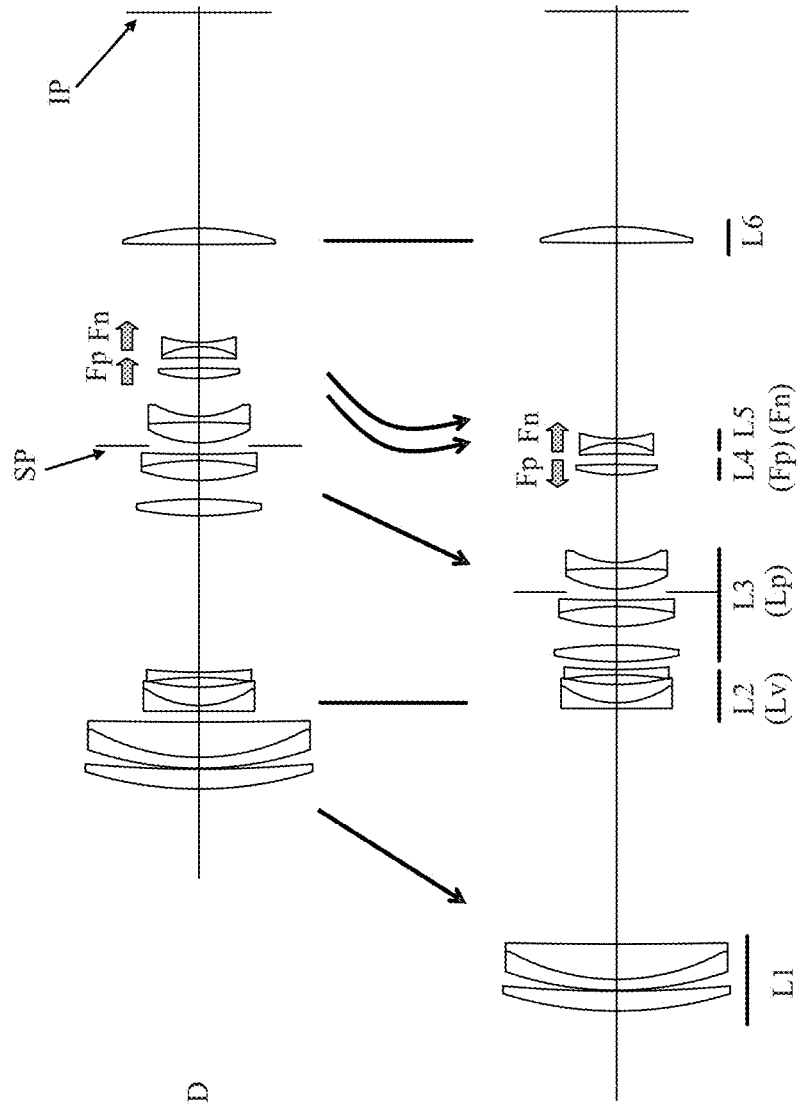

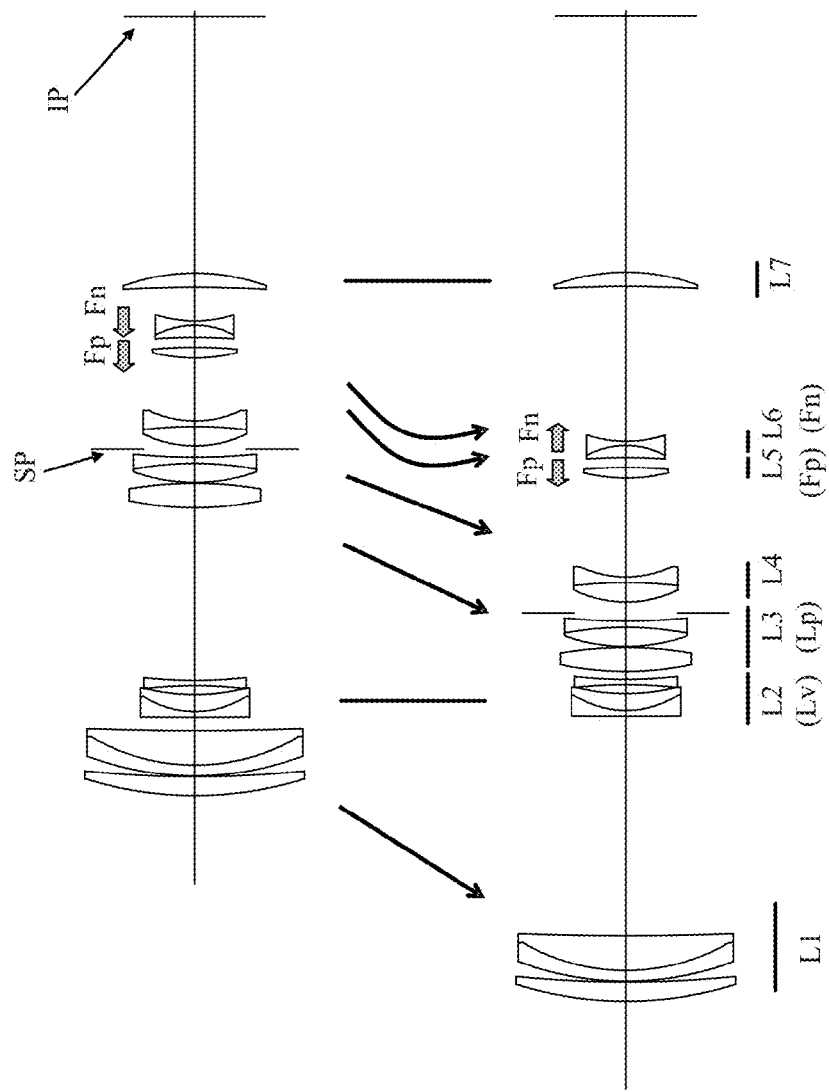
FIG. 10A  WIDE ANGLE END
FIG. 10B  TELEPHOTO END

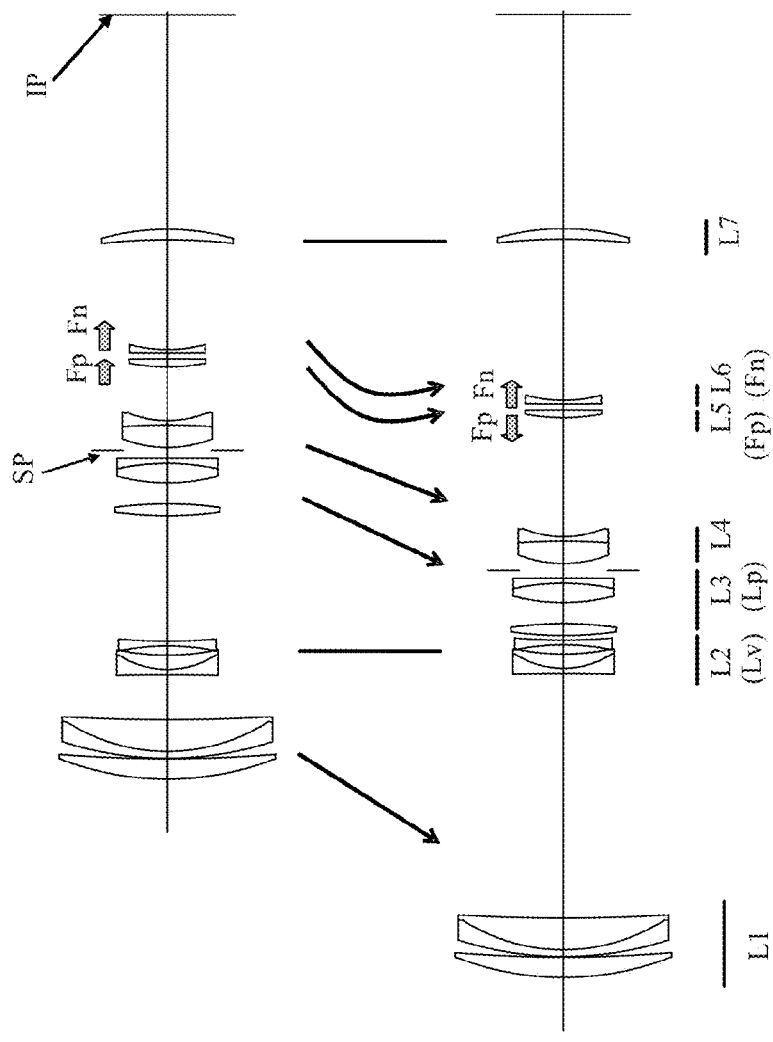
FIG. 13A WIDE ANGLE END
FIG. 13B TELEPHOTO END

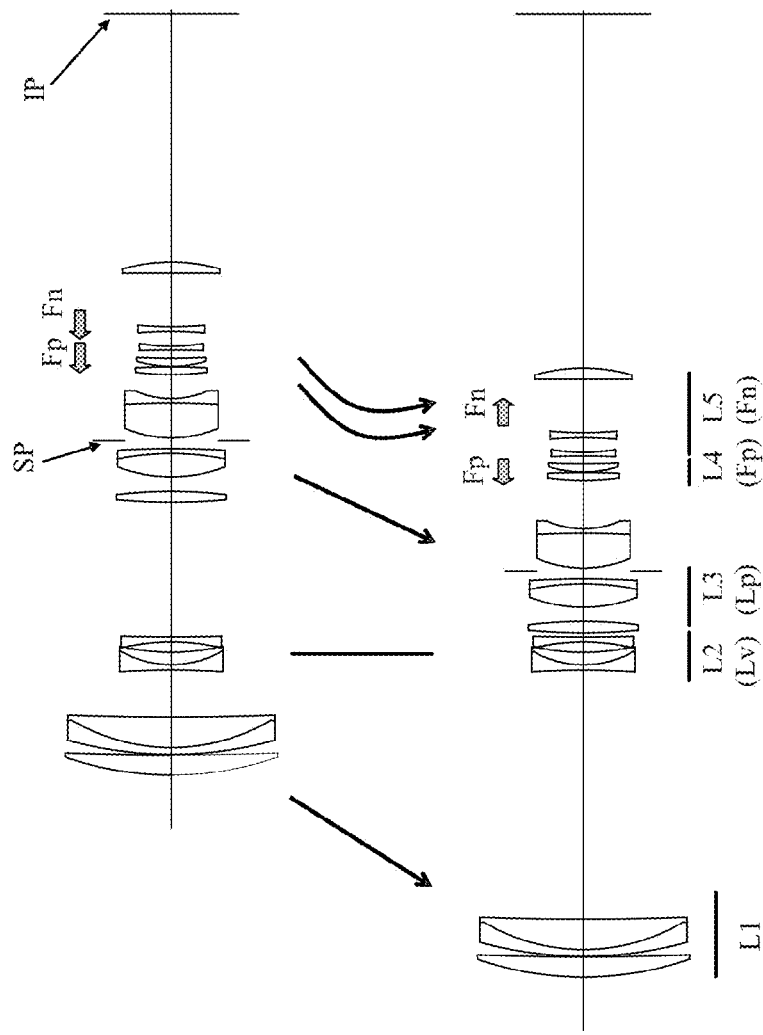
FIG. 16A  WIDE ANGLE END
FIG. 16B  TELEPHOTO END

ZOOM LENS AND IMAGE-PICKUP APPARATUS

BACKGROUND OF THE INVENTION

1. Field of the Invention

The present invention relates to a zoom lens and an image pickup apparatus including the same. For example, they are suitable for a digital still camera and a digital video camera.

2. Description of the Related Art

Recently, a single lens reflex camera is required for having a video recording function and performing autofocus during recording a video. A contrast system evaluating focusing state of an image pickup optical system by detecting high frequency component in an image pickup signal is widely used as an autofocus system during recording a video.

It is important to properly select a zoom type and the number of a focus lens unit in order to acquire a zoom lens which has small aberration variations during focusing and high optical performance over general object distances and can perform high speed focusing.

Japanese Patent Laid-Open No. 11-202203 discloses a zoom lens which includes, in order from an object side to an image side, a first lens unit having a positive refractive power, a second lens unit having a negative refractive power, a third lens unit having a negative refractive power, a fourth lens unit having a positive refractive power and a fifth lens unit having a negative refractive power, and moves the first lens unit during focusing. However, when the first lens unit which has the longest effective diameter and is heaviest in all lens units is moved for focusing, focusing speed becomes slower and driving noise of the focus lens unit becomes louder.

U.S. Pat. No. 8,068,281 discloses a zoom lens which includes, in order from an object side to an image side, a first lens unit having a positive refractive power, a second lens unit having a negative refractive power, a third lens unit having a negative refractive power, a fourth lens unit having a positive refractive power, a fifth lens unit having a negative refractive power and a sixth lens unit having a positive refractive power, and moves the fifth lens unit during focusing. However, since one lens unit only moves during focusing, variation of optical performance by focusing becomes larger, and especially the optical performance tends to decrease when focusing to a close distance object. Additionally, at a telephoto side, a movement amount of the focus lens becomes larger, and as a result focusing speed tends to become slower.

Japanese Patent Laid-Open No. 2000-047107 discloses a zoom lens which includes, in order from an object side to an image side, a first lens unit having a positive refractive power, a second lens unit having a negative refractive power, a third lens unit having a positive refractive power, a fourth lens unit having a negative refractive power, a fifth lens unit having a positive refractive power and a sixth lens unit having a negative refractive power, and moves the fourth lens unit and the sixth lens unit during focusing. However, at a telephoto side, optical performance varies according to object distance and a movement amount of a focus lens unit tends to become larger.

SUMMARY OF THE INVENTION

The present invention provides a zoom lens and an image pickup apparatus including the same which have high optical performance over general object distances and can perform high speed focusing.

A zoom lens as one as aspect of the present invention includes a plurality of lens units having a negative refractive power and changes a distance between adjacent lens units during zooming. The zoom lens includes a lens unit Lv positioned at the most object side of the plurality of lens units having the negative refractive power, a lens unit Lp positioned at the most object side of lens units having a positive refractive power, the lens units being positioned at an image side of the lens unit Lv, a lens unit Fp having a positive refractive power positioned at an image side of the lens unit Lp, the lens unit Fp being configured to move during focusing and a lens unit Fn having a negative refractive power positioned at the image side of the lens unit Lp, the lens unit Fn being configured to move during focusing. The lens unit Fp and the lens unit Fn move in the same direction in a first zoom range during focusing from infinity to minimum object distance, and the lens unit Fp moves to an object side and the lens unit Fn moves to an image side in a second zoom range which is positioned at a telephoto side relative to the first zoom range during focusing from infinity to minimum object distance.

Further features of the present invention will become apparent from the following description of exemplary embodiments with reference to the attached drawings.

BRIEF DESCRIPTION OF THE DRAWINGS

FIGS. 1A and 1B are sectional views at a wide angle end and at a telephoto end of a zoom lens according to a first embodiment of the present invention.

FIGS. 4A and 4B are sectional views at a wide angle end and at a telephoto end of a zoom lens according to a second embodiment of the present invention.

FIGS. 7A and 7B are sectional views at a wide angle end and at a telephoto end of a zoom lens according to a third embodiment of the present invention.

FIGS. 10A and 10B are sectional views at a wide angle end and at a telephoto end of a zoom lens according to a fourth embodiment of the present invention.

FIGS. 13A and 13B are sectional views at a wide angle end and at a telephoto end of a zoom lens according to a fifth embodiment of the present invention.

FIGS. 16A and 16B are sectional views at a wide angle end and at a telephoto end of a zoom lens according to a sixth embodiment of the present invention.

DESCRIPTION OF THE EMBODIMENTS

Hereafter, embodiments of a zoom lens and an image pickup apparatus including the same of the present invention are described. The zoom lens of the present invention includes a plurality of lens units having a negative refractive power and changes a distance between adjacent lens units during zooming.

A lens unit Lv is a lens unit positioned at the most object side of the plurality of lens units having a negative refractive power, and a lens unit Lp is a lens unit positioned at the most object side of lens units that has a positive refractive power and is positioned at an image side of the lens unit Lv. A lens unit Fp having a positive refractive power and a lens unit Fn having a negative refractive power that are positioned at an image side of the lens unit Lp move during focusing. During focusing from infinity to minimum object distance, the lens unit Fp and the lens unit Fn move in the same direction in a first zoom range, and the lens unit Fp moves to an object side and the lens unit Fn moves to an image side in a second zoom range which is a telephoto side relative to the first zoom range.

Figure 2A:
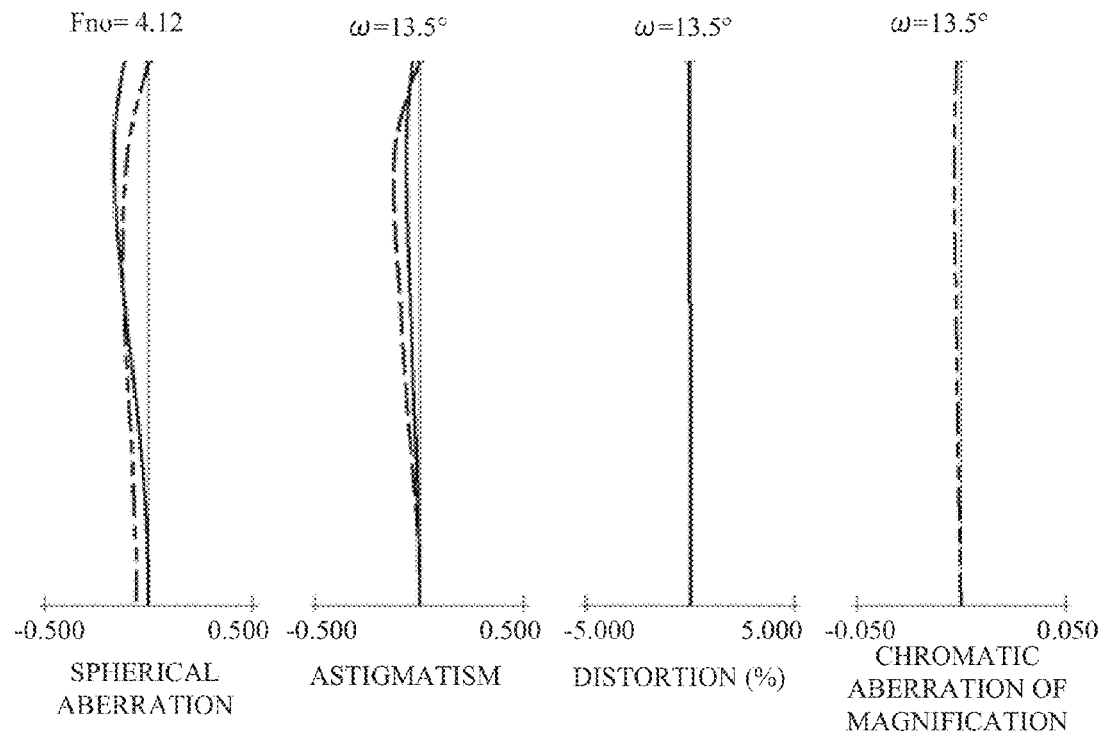
FIGS. 2A and 2B are aberration diagrams at a wide angle end and at a telephoto end when focusing on infinity of numerical example 1 of the present invention.
Figure 2B:
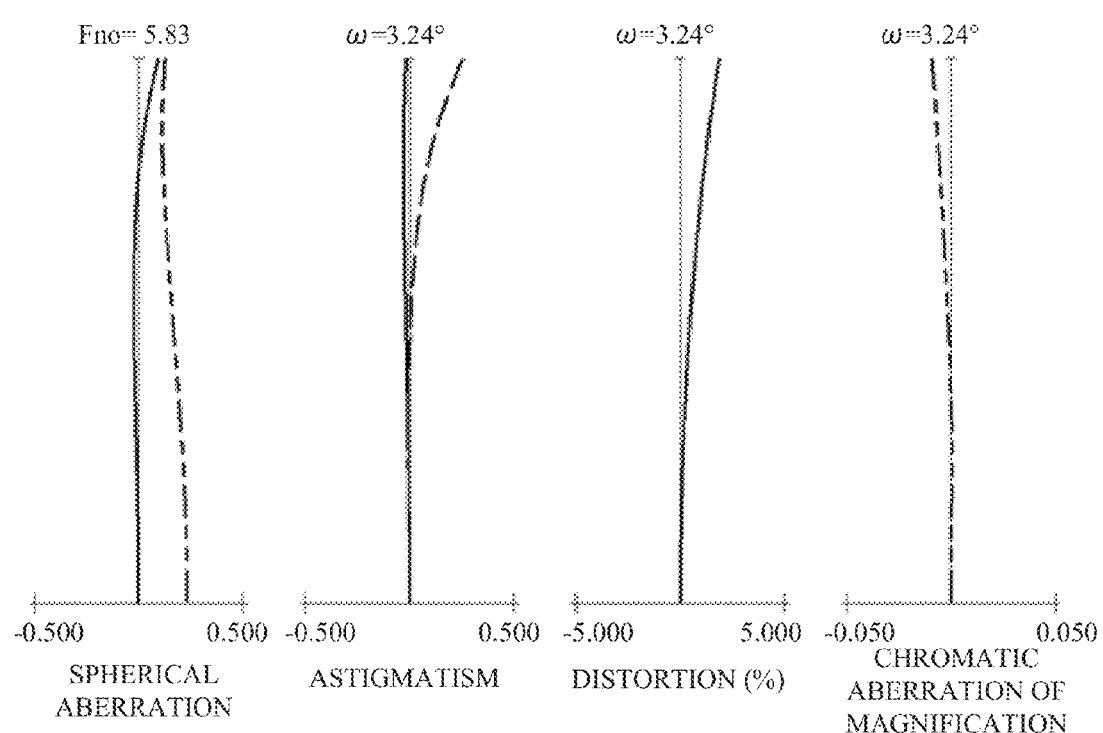
Figure 3A:
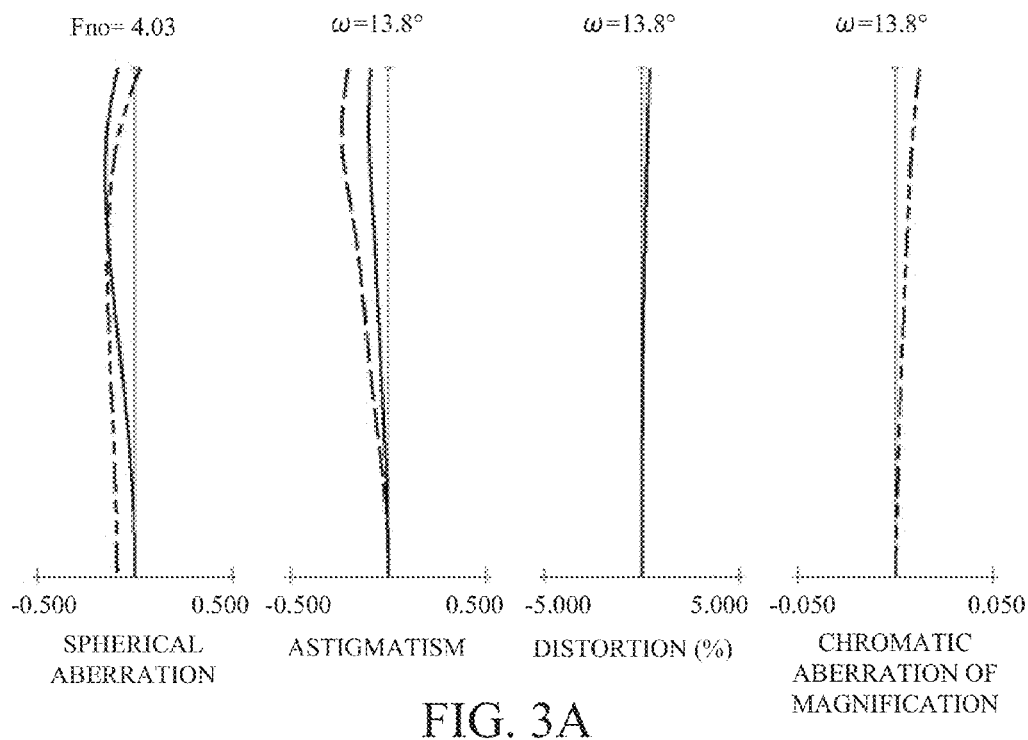
FIGS. 3A and 3B are aberration diagrams at a wide angle end and at a telephoto end when focusing on minimum object distance of numerical example 1 of the present invention.
Figure 3B:
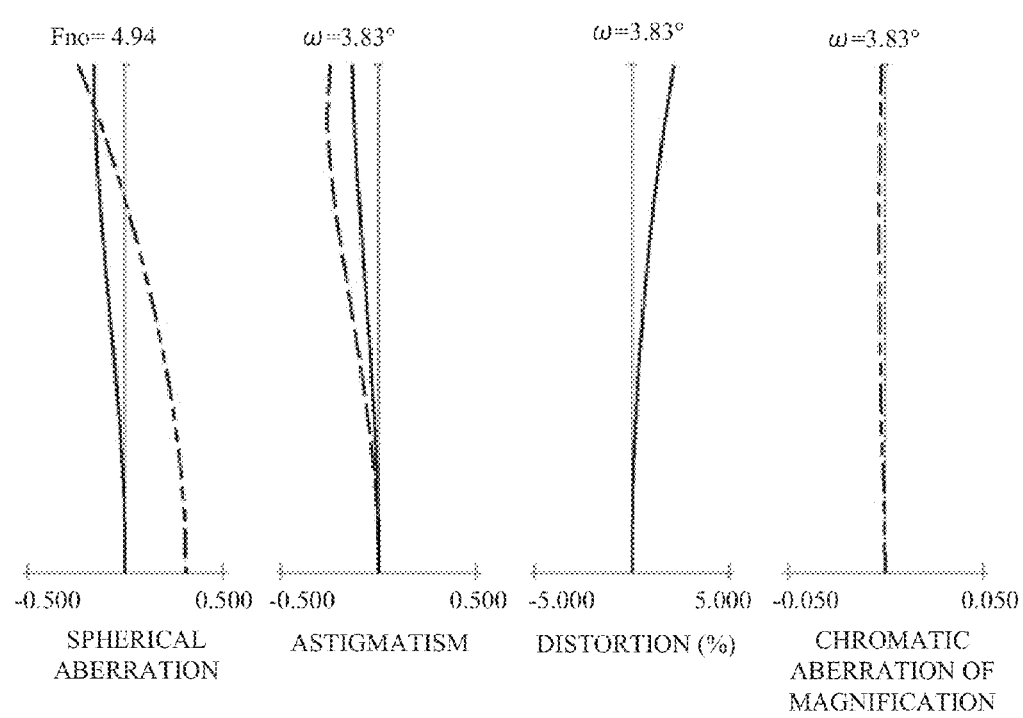

FIGS. 1A and 1B are sectional views at a wide angle end (a short focal length end) and at a telephoto end (a long focal length end) of a zoom lens according to a first embodiment of the present invention. FIGS. 2A and 2B are respectively aberration diagrams at a wide angle end and at a telephoto end when focusing on infinity of numerical example 1. FIGS. 3A and 3B are respectively aberration diagrams at a wide angle end and at a telephoto end when focusing on minimum object distance (an object distance of 1.2 m) of numerical example 1.

Figure 5A:
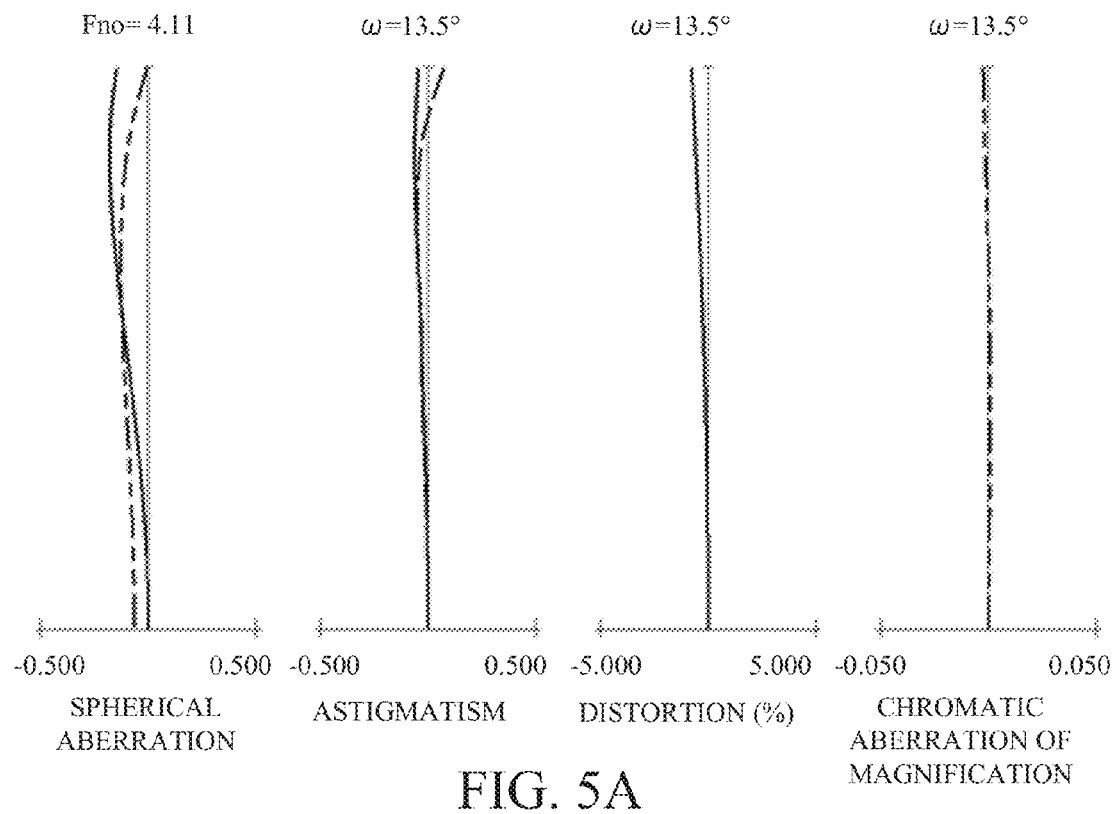
FIGS. 5A and 5B are aberration diagrams at a wide angle end and at a telephoto end when focusing on infinity of numerical example 2 of the present invention.
Figure 5B:
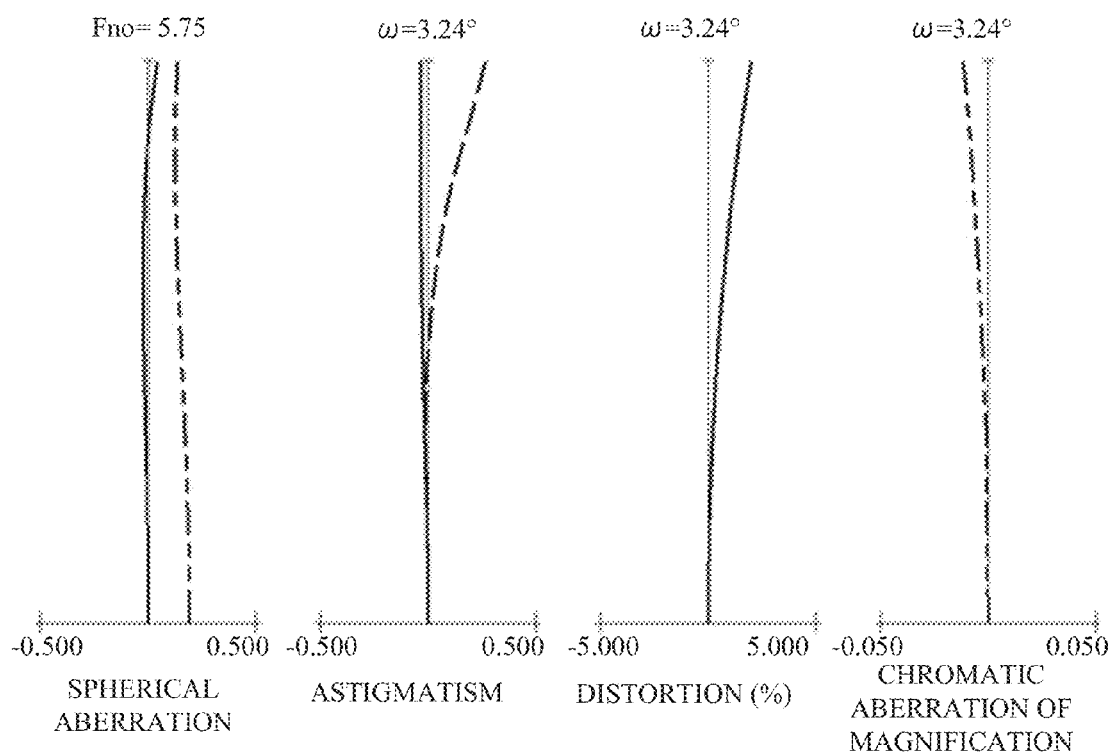
Figure 6A:
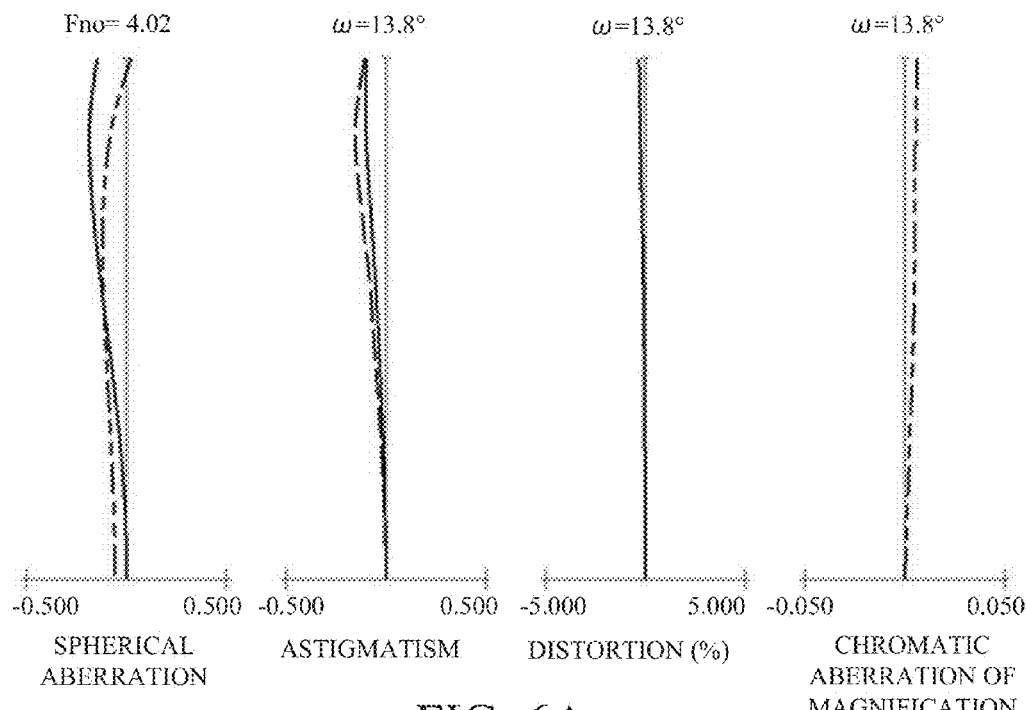
FIGS. 6A and 6B are aberration diagrams at a wide angle end and at a telephoto end when focusing on minimum object distance of numerical example 2 of the present invention.
Figure 6B:
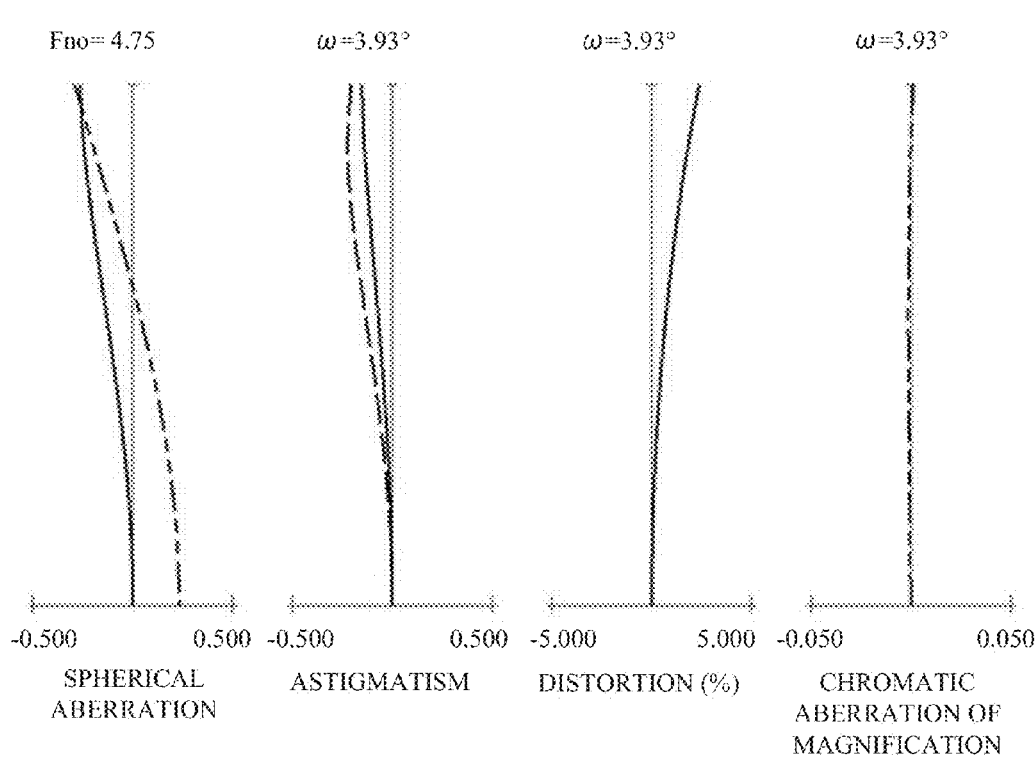

FIGS. 4A and 4B are sectional views at a wide angle end and at a telephoto end of a zoom lens according to a second embodiment of the present invention. FIGS. 5A and 5B are respectively aberration diagrams at a wide angle end and at a telephoto end when focusing on infinity of numerical example 2. FIGS. 6A and 6B are respectively aberration diagrams at a wide angle end and at a telephoto end when focusing on minimum object distance (an object distance of 1.2 m) of numerical example 2.

Figure 8A:
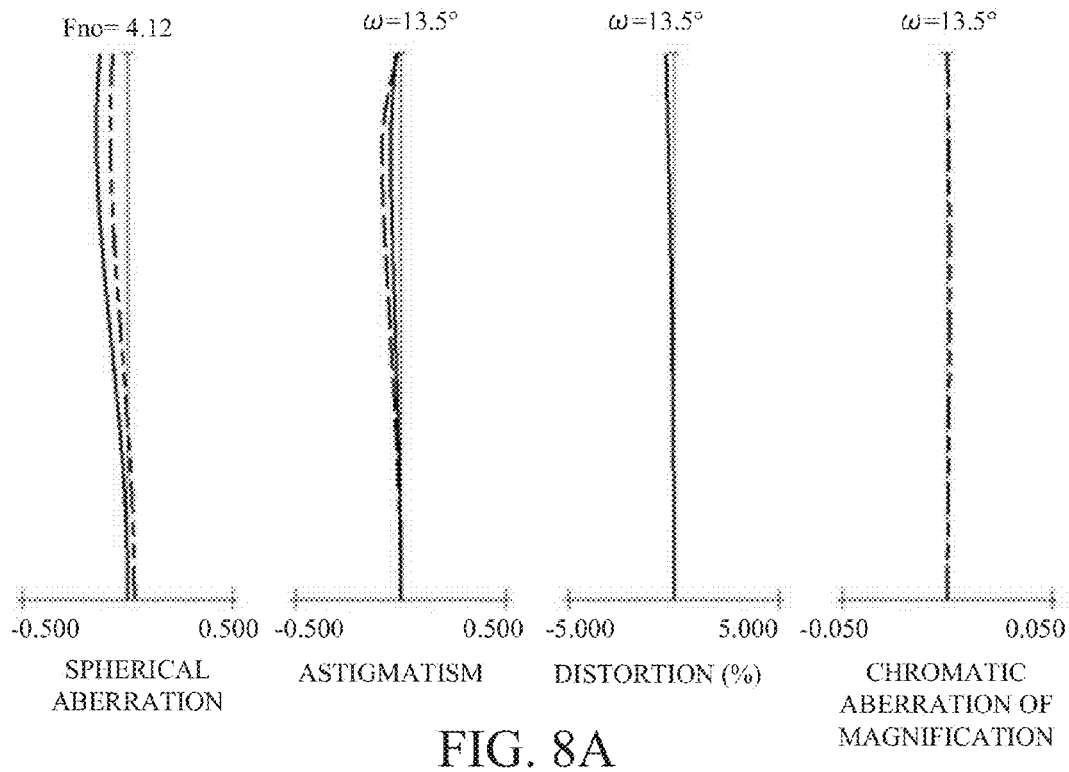
FIGS. 8A and 8B are aberration diagrams at a wide angle end and at a telephoto end when focusing on infinity of numerical example 3 of the present invention.
Figure 8B:
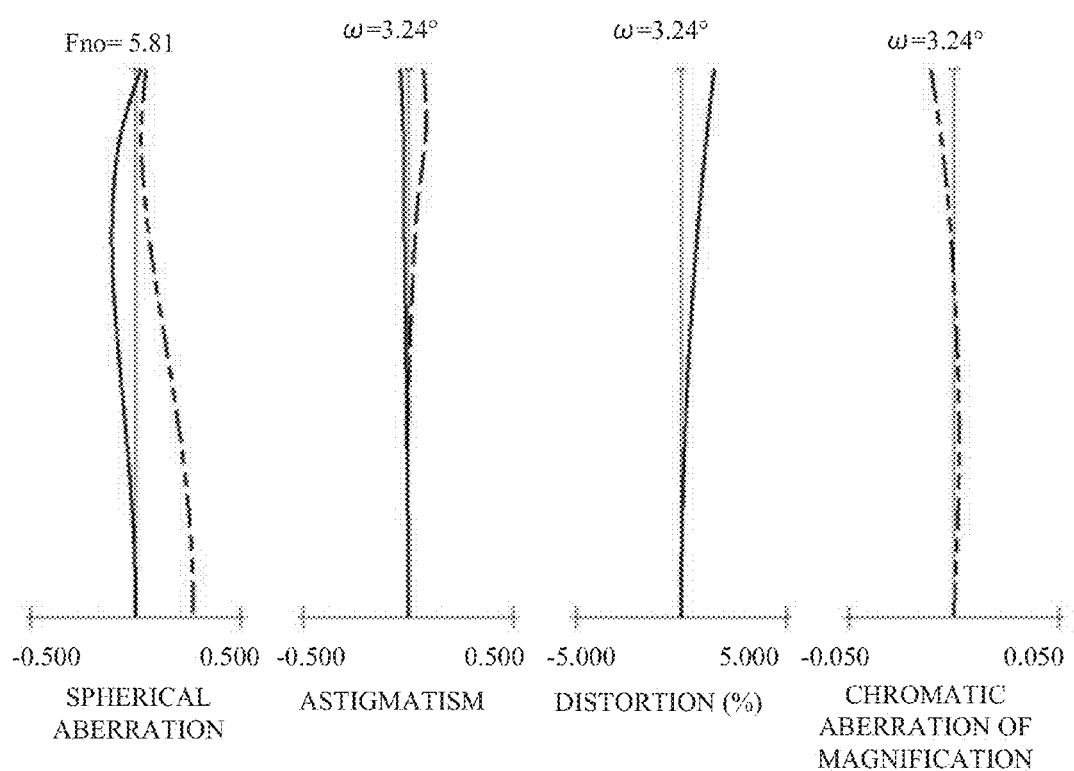
Figure 9A:
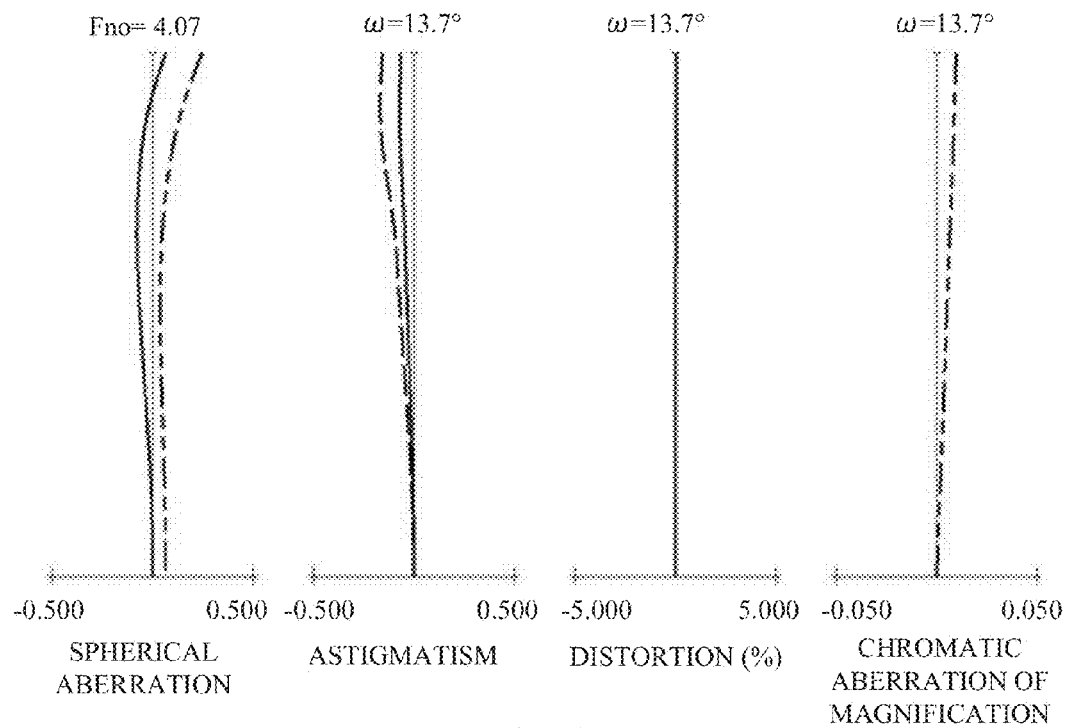
FIGS. 9A and 9B are aberration diagrams at a wide angle end and at a telephoto end when focusing on minimum object distance of numerical example 3 of the present invention.
Figure 9B:
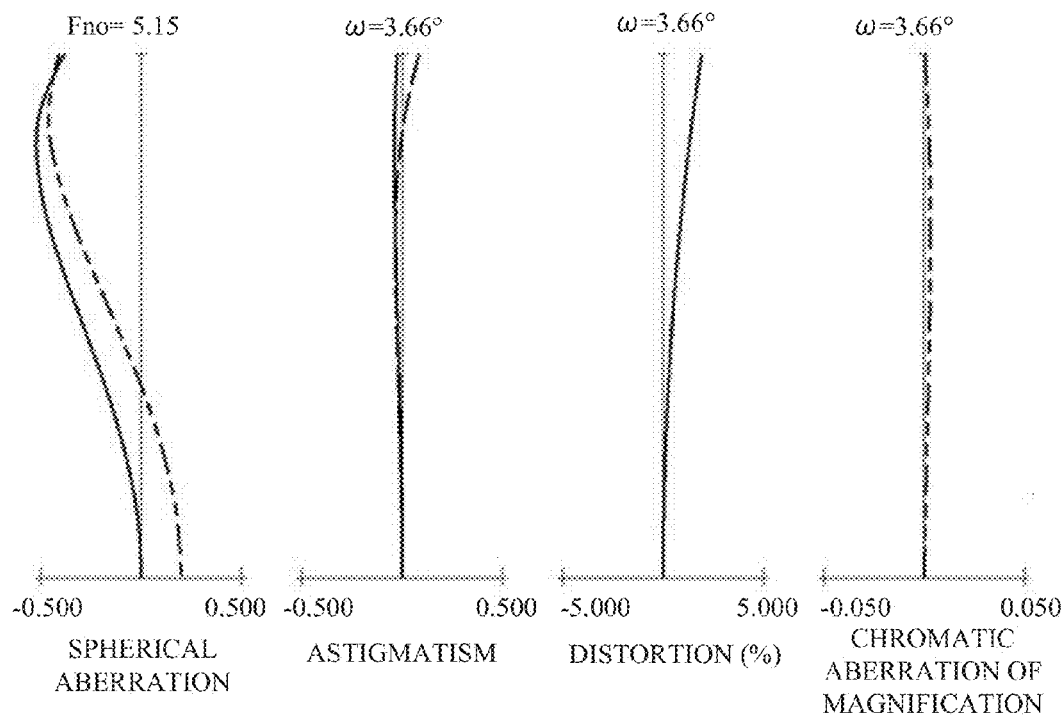

FIGS. 7A and 7B are sectional views at a wide angle end and at a telephoto end of a zoom lens according to a third embodiment of the present invention. FIGS. 8A and 8B are respectively aberration diagrams at a wide angle end and at a telephoto end when focusing on infinity of numerical example 3. FIGS. 9A and 9B are respectively aberration diagrams at a wide angle end and at a telephoto end when focusing on minimum object distance (an object distance of 1.2 m) of numerical example 3.

Figure 11A:
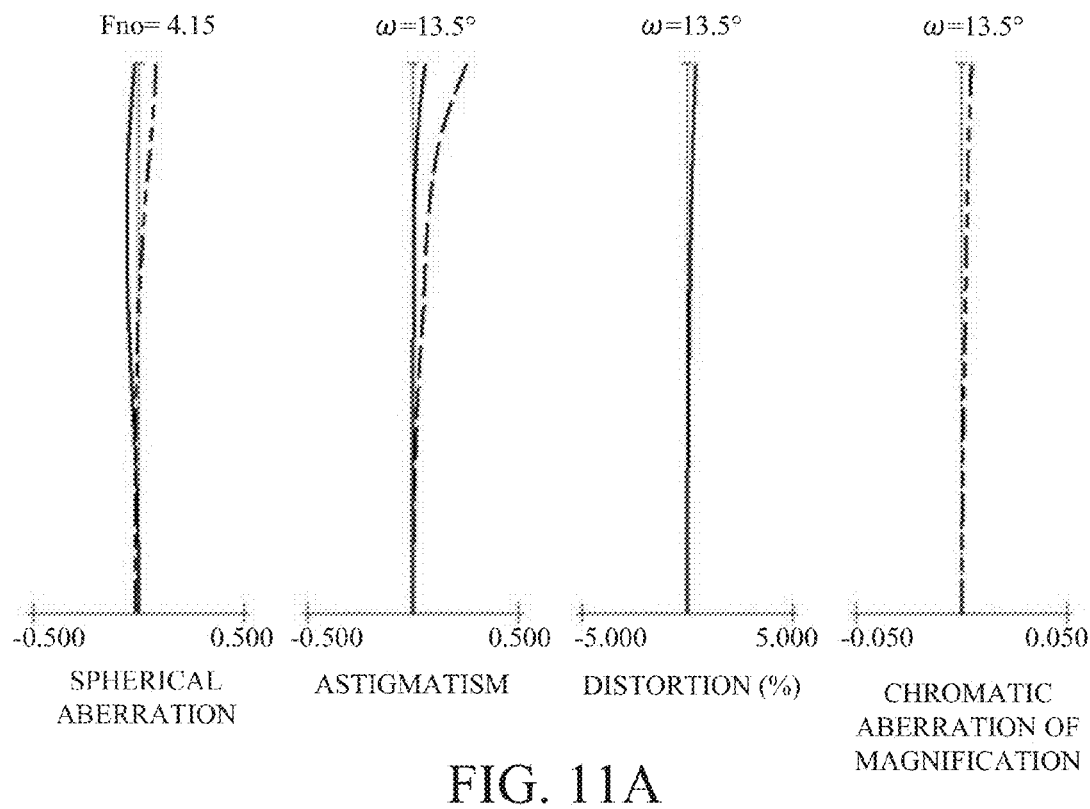
FIGS. 11A and 11B are aberration diagrams at a wide angle end and at a telephoto end when focusing on infinity of numerical example 4 of the present invention.
Figure 11B:
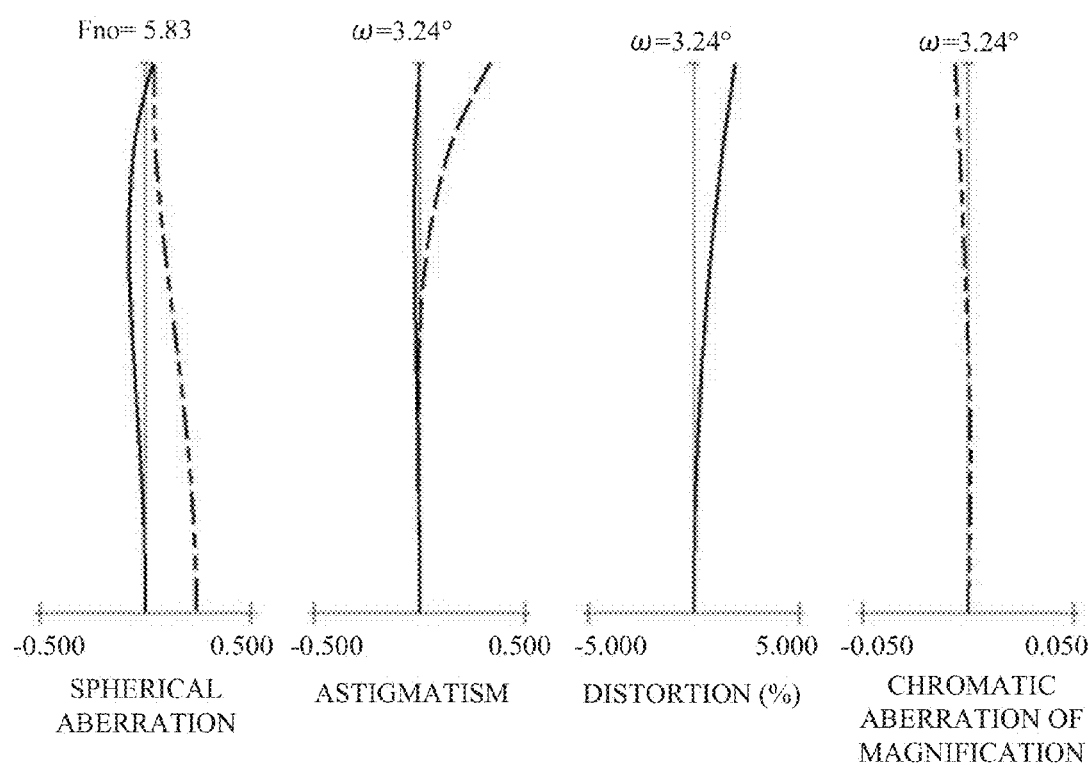
Figure 12A:
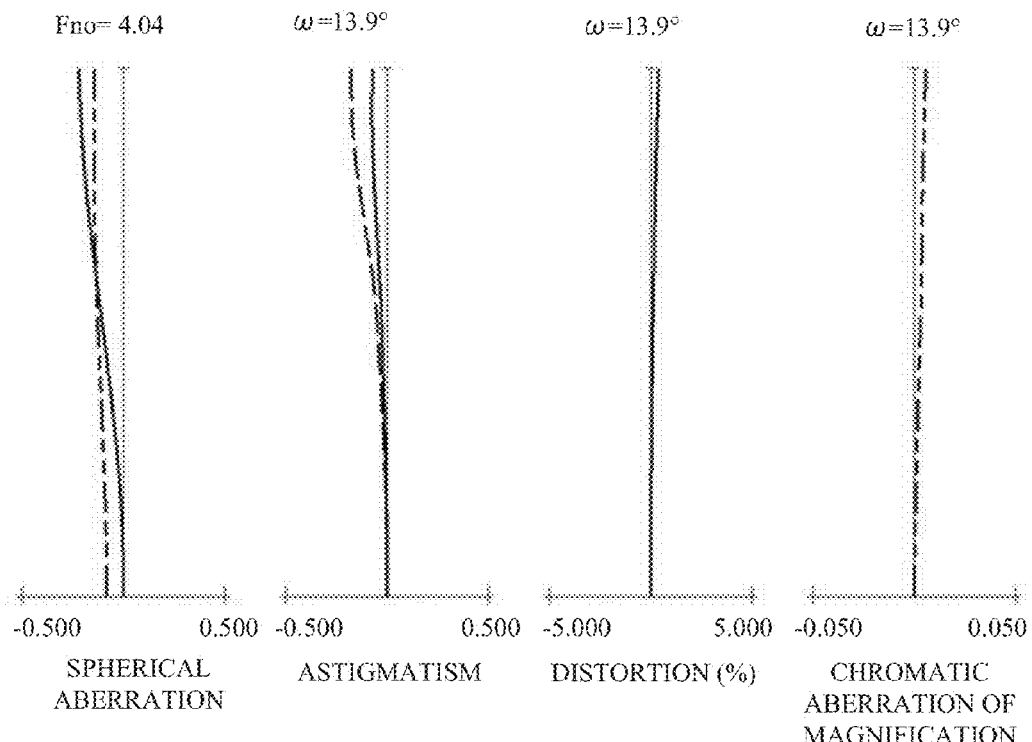
FIGS. 12A and 12B are aberration diagrams at a wide angle end and at a telephoto end when focusing on minimum object distance of numerical example 4 of the present invention.
Figure 12B:
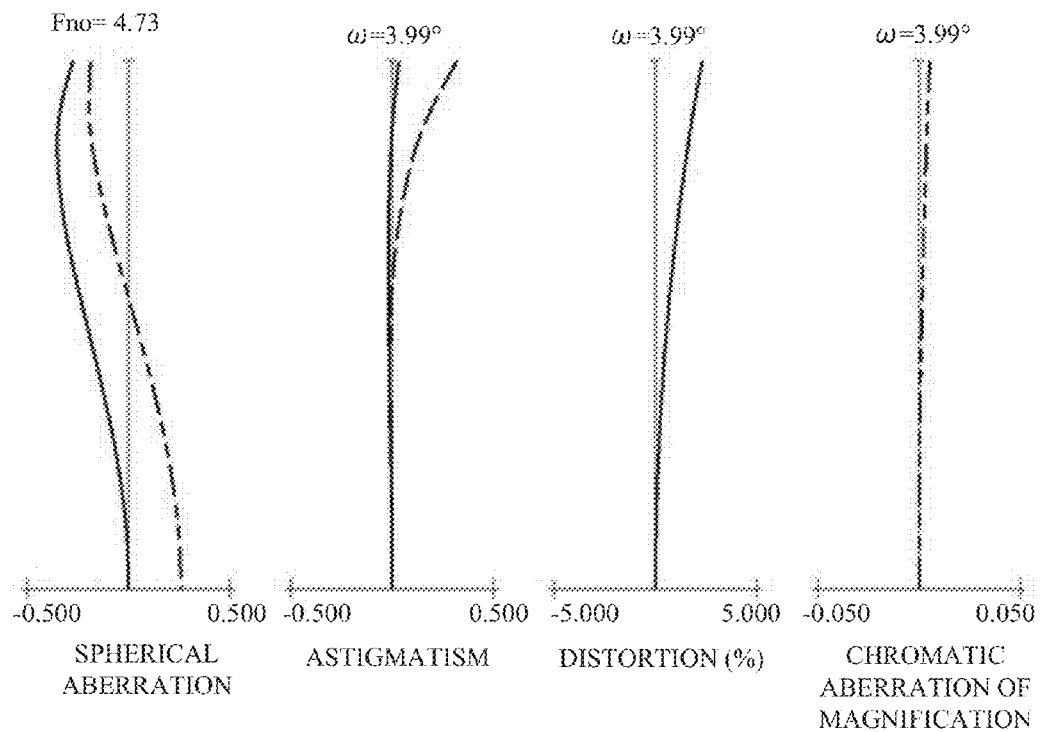

FIGS. 10A and 10B are sectional views at a wide angle end and at a telephoto end of a zoom lens according to a fourth embodiment of the present invention. FIGS. 11A and 11B are respectively aberration diagrams at a wide angle end and at a telephoto end when focusing on infinity of numerical example 4. FIGS. 12A and 12B are respectively aberration diagrams at a wide angle end and at a telephoto end when focusing on minimum object distance (an object distance of 1.2 m) of numerical example 4.

Figure 14A:
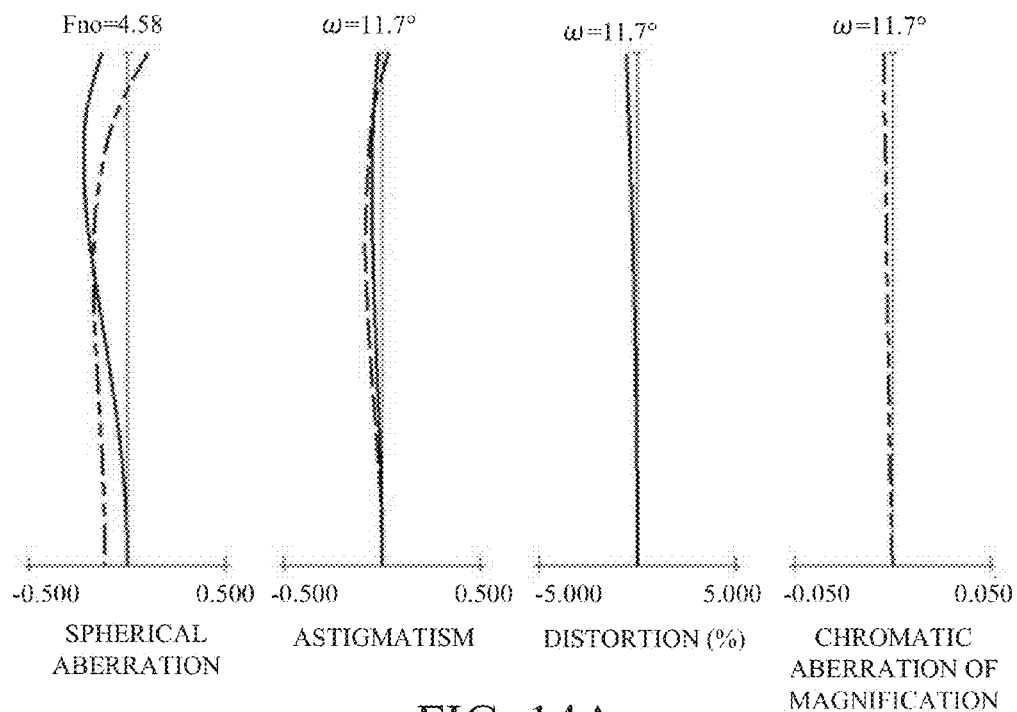
FIGS. 14A and 14B are aberration diagrams at a wide angle end and at a telephoto end when focusing on infinity of numerical example 5 of the present invention.
Figure 14B:
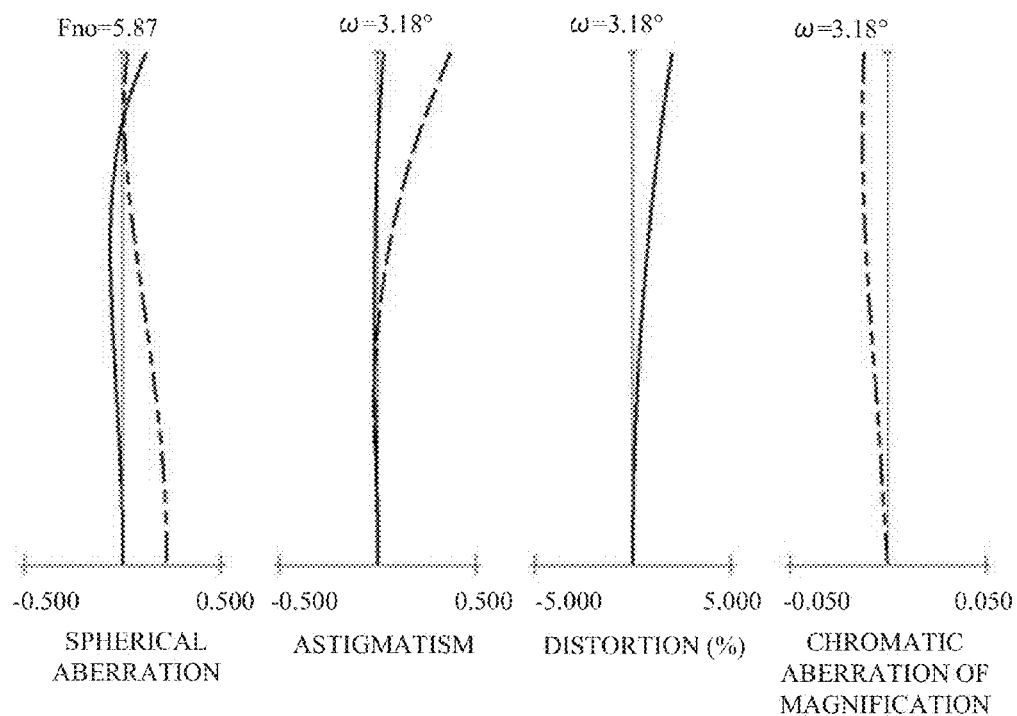
Figure 15A:
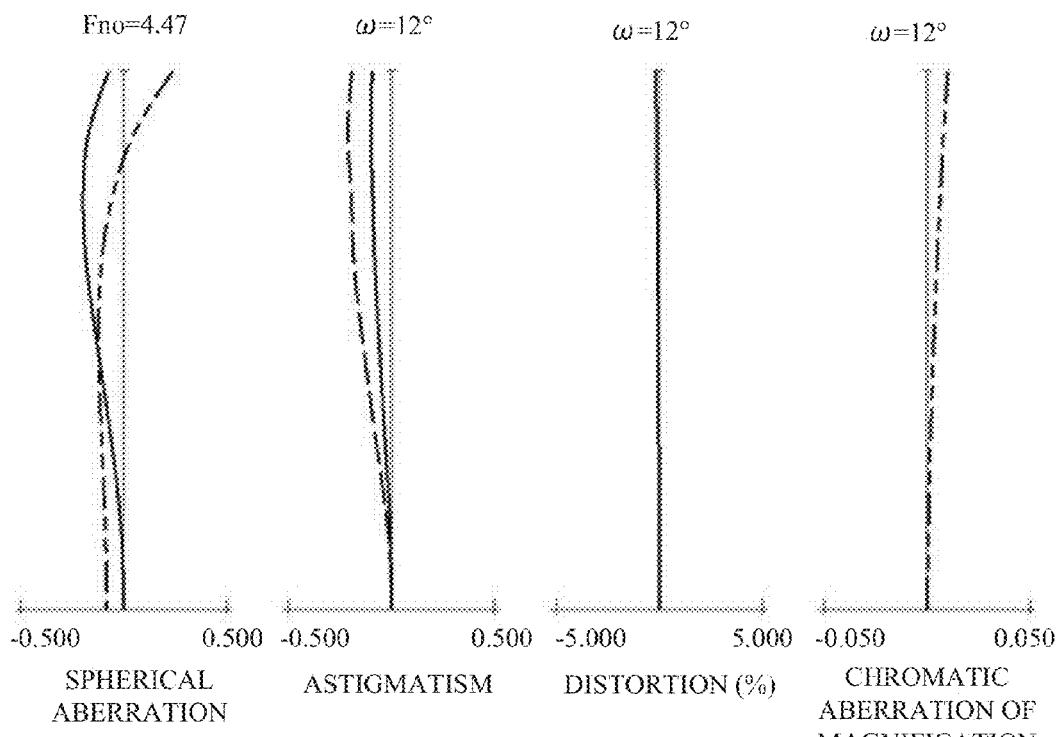
FIGS. 15A and 15B are aberration diagrams at a wide angle end and at a telephoto end when focusing on minimum object distance of numerical example 5 of the present invention.
Figure 15B:
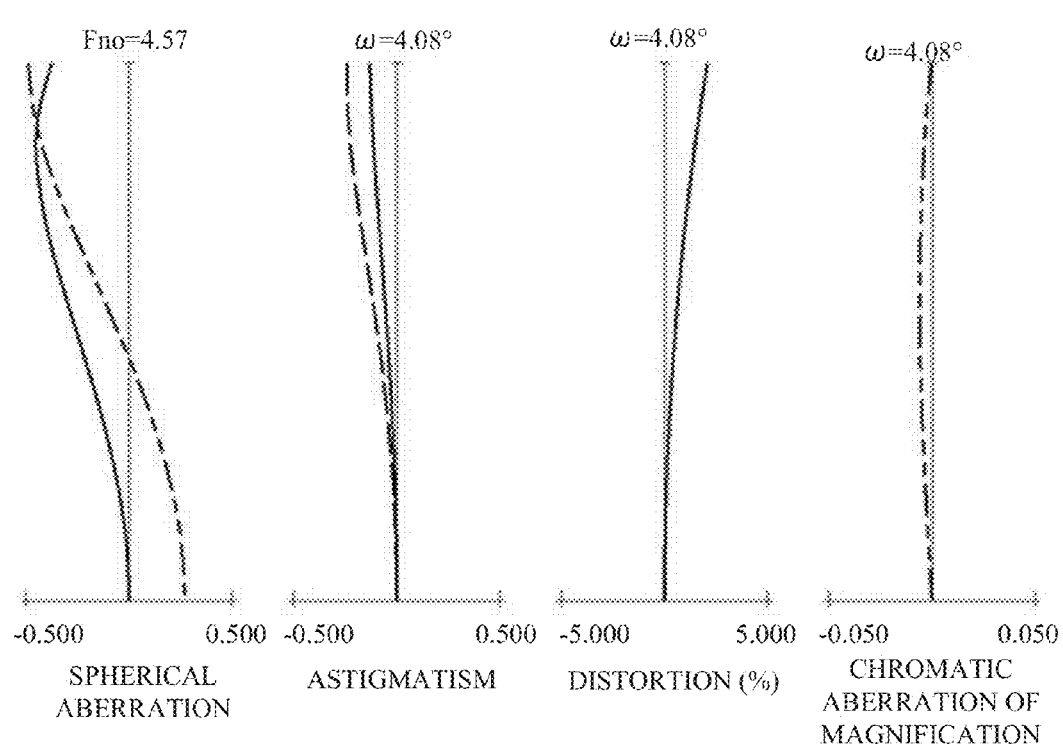

FIGS. 13A and 13B are sectional views at a wide angle end and at a telephoto end of a zoom lens according to a fifth embodiment of the present invention. FIGS. 14A and 14B are respectively aberration diagrams at a wide angle end and at a telephoto end when focusing on infinity of numerical example 5. FIGS. 15A and 15B are respectively aberration diagrams at a wide angle end and at a telephoto end when focusing on minimum object distance (an object distance of 1.9 m) of numerical example 5.

Figure 17A:
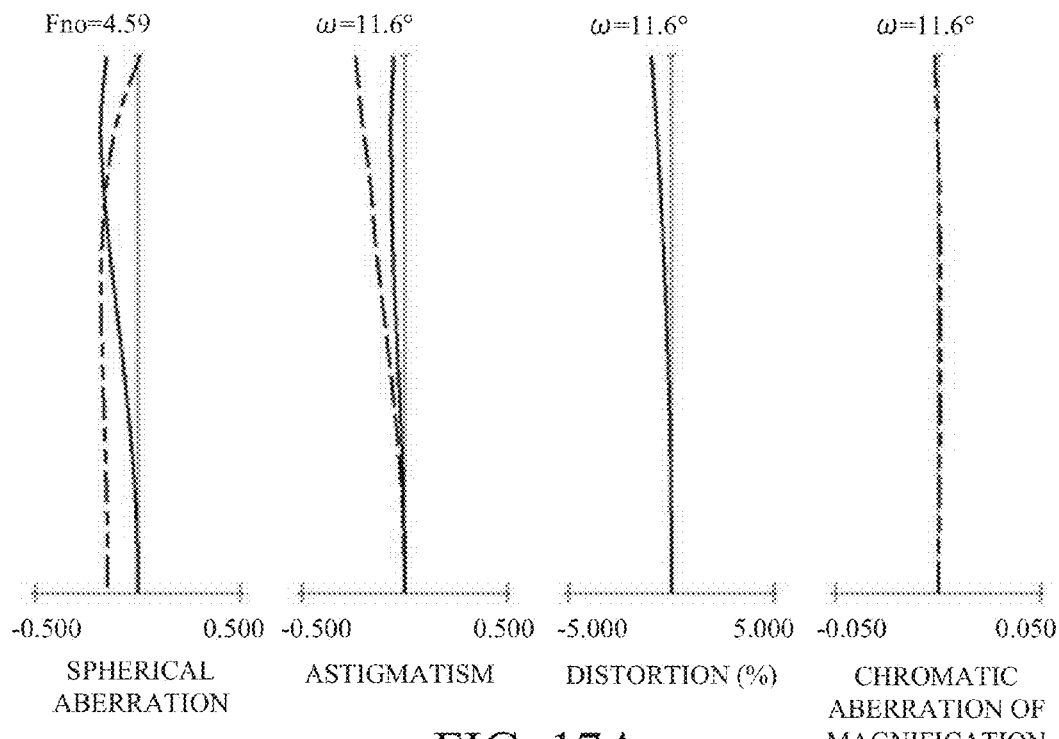
FIGS. 17A and 17B are aberration diagrams at a wide angle end and at a telephoto end when focusing on infinity of numerical example 6 of the present invention.
Figure 17B:
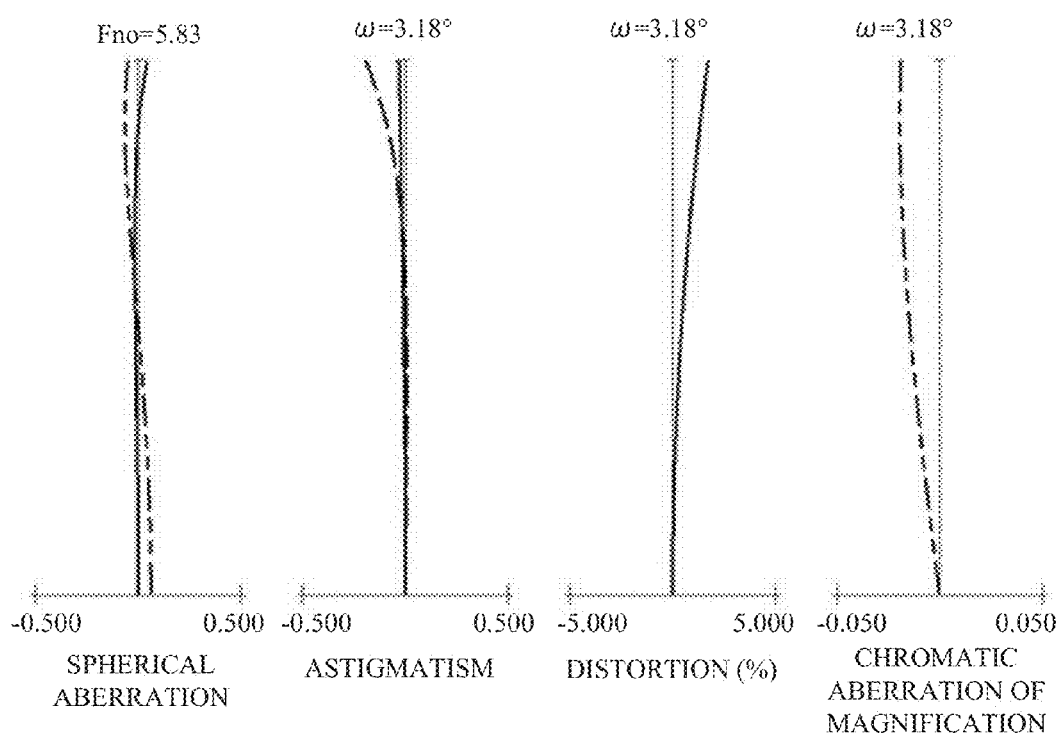
Figure 18A:
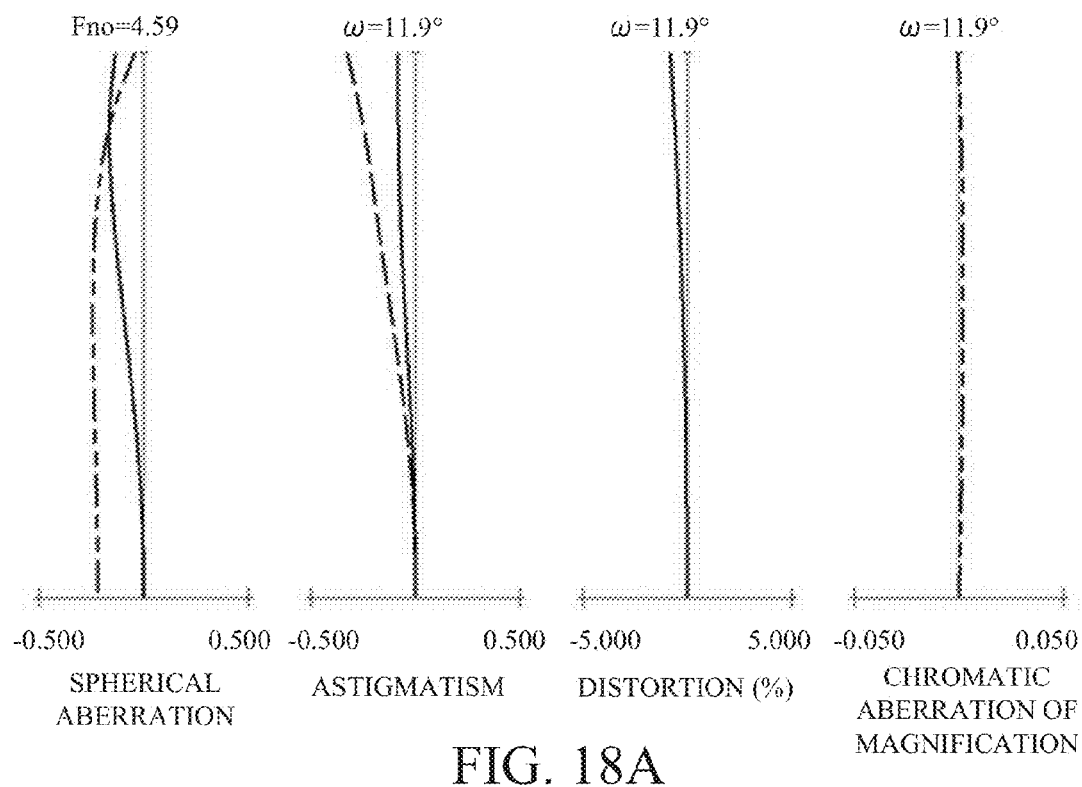
FIGS. 18A and 18B are aberration diagrams at a wide angle end and at a telephoto end when focusing on minimum object distance of numerical example 6 of the present invention.
Figure 18B:
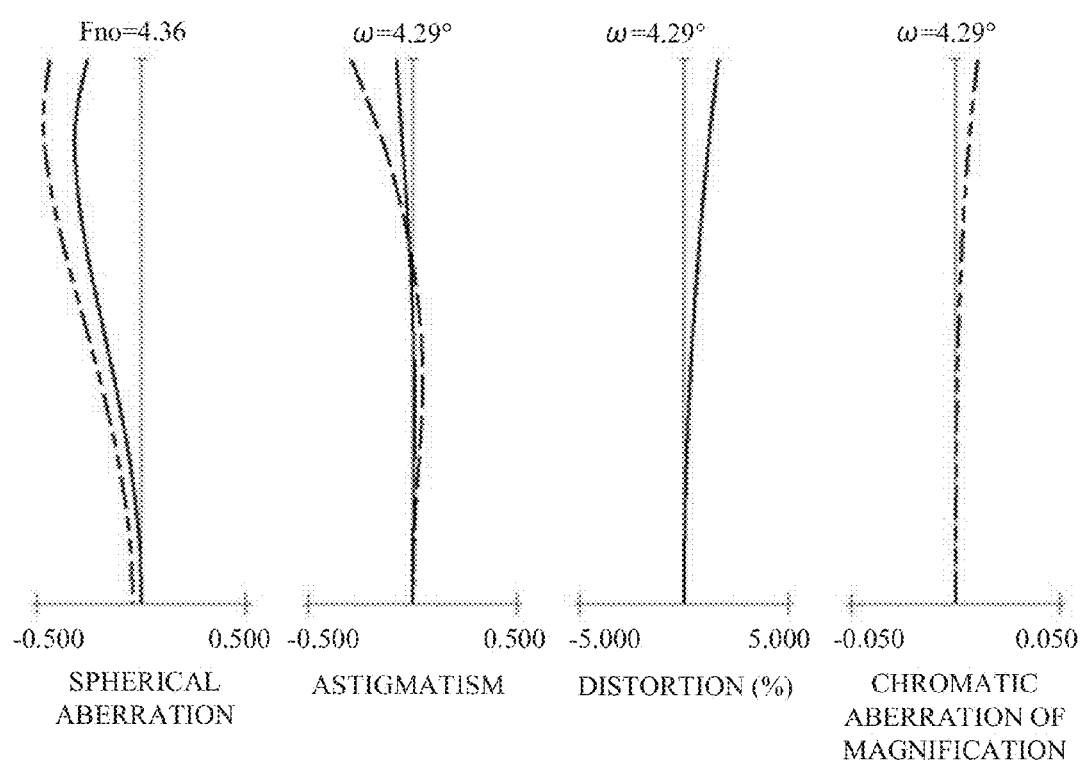

FIGS. 16A and 16B are sectional views at a wide angle end and at a telephoto end of a zoom lens according to a sixth embodiment of the present invention. FIGS. 17A and 17B are respectively aberration diagrams at a wide angle end and at a telephoto end when focusing on infinity of numerical example 6. FIGS. 18A and 18B are respectively aberration diagrams at a wide angle end and at a telephoto end when focusing on minimum object distance (an object distance of 1.9 m) of numerical example 6.

Figure 19:
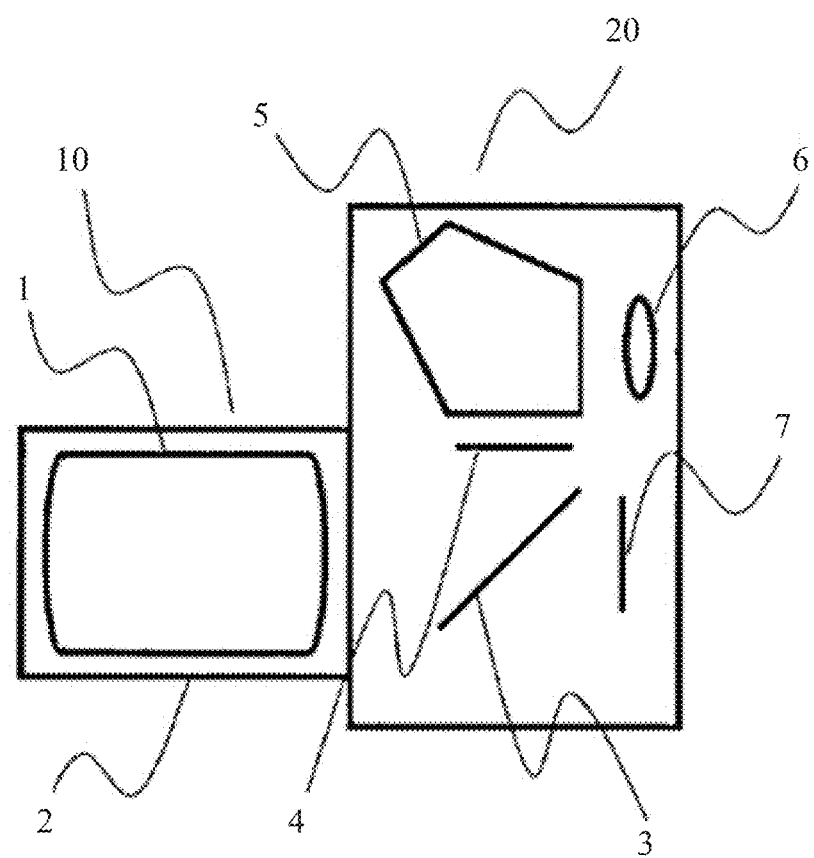
FIG. 19 is a schematic diagram of a main part of an image pickup apparatus of the present invention.

FIG. 19 is a schematic diagram of a main part of an image pickup apparatus of the present invention having the zoom lens of the present invention.

The zoom lens of each embodiment is an image pickup optical system used for an image pickup apparatus such as a video camera, a digital camera and a silver-halide film camera. In the sectional view of the lens, the left side is an object side (forward) and the right side is an image side (a rear side). In the sectional view of the lens, i denotes an order of the zoom lens unit from the object side and Li denotes an i-th lens unit.

SP denotes an aperture stop. IP denotes an image plane, and corresponds to an image pickup plane of a solid image pickup element (a photoelectric conversion element) such as a CCD sensor and a CMOS sensor when using as an image pickup optical system of a video camera and a digital camera, or a film plane when using as a silver-halide film camera. The arrow illustrates a movement locus during zooming from the wide angle end to the telephoto end. And thick arrow illustrates a moving direction during focusing from infinity to minimum object distance.

In a spherical aberration diagrams, a solid line represents d-line and a broken line represents g-line. In an astigmatism diagram, a broken line represents meridional image surface of d-line and a solid line represents sagittal image surface of d-line. Additionally, in a diagram illustrating distortion, distortion of d-line is illustrated. In a diagram illustrating chromatic aberration of magnification, chromatic aberration of magnification of g-line is illustrated. Fno denotes f-number and ω denotes an image pickup half angle of view. In the following embodiments, the wide angle end and the telephoto end are both ends of a range where the variable magnification lens unit is capable of moving on an optical axis in a system.

A zoom lens of the first, the fourth and the fifth embodiments respectively illustrated in FIGS. 1, 10 and 13 includes, in order from an object side to an image side, a first lens unit L1 having a positive refractive power, a second lens unit L2 having a negative refractive power, a third lens unit L3 having a positive refractive power, a fourth lens unit L4 having a negative refractive power, a fifth lens unit L5 having a positive refractive power, a sixth lens unit L6 having a negative refractive power and a seventh lens unit L7 having a positive refractive power. Here, the fifth lens unit L5 corresponds to a lens unit Fp and the sixth lens unit L6 corresponds to a lens unit Fn.

A zoom lens of the second and the third embodiments respectively illustrated in FIGS. 4 and 7 includes, in order from an object side to an image side, a first lens unit L1 having a positive refractive power, a second lens unit L2 having a negative refractive power, a third lens unit L3 having a positive refractive power, a fourth lens unit L4 having a positive refractive power, a fifth lens unit L5 having a negative refractive power and a sixth lens unit L6 having a positive refractive power. Here, the fourth lens unit L4 corresponds to a lens unit Fp and the fifth lens unit L5 corresponds to a lens unit Fn.

A zoom lens of the sixth embodiment illustrated in FIG. 16 includes, in order from an object side to an image side, a first lens unit L1 having a positive refractive power, a second lens unit L2 having a negative refractive power, a third lens unit L3 having a positive refractive power, a fourth lens unit L4 having a positive refractive power and a fifth lens unit L5 having a negative refractive power. Here, the fourth lens unit L4 corresponds to a lens unit Fp and the fifth lens unit L5 corresponds to a lens unit Fn. Additionally, in each embodiment, the second lens unit L2 corresponds to a lens unit Lv and the third lens unit L3 corresponds to a lens unit Lp.

The feature of the zoom lens of the present invention is explained by comparing with the zoom lens of each patent literature as described above.

Japanese Patent Laid-Open No. 11-202203 discloses a zoom lens which includes, in order from an object side to an image side, a first lens unit having a positive refractive power, a second lens unit having a negative refractive power, a third lens unit having a negative refractive power, a fourth lens unit having a positive refractive power and a fifth lens unit having a negative refractive power, and moves the first lens unit during focusing. Variations of optical performance according to object distance can become comparatively small by optimizing lens shapes of the first lens unit because generally, a light height from an image side of the first lens unit to the second lens unit is nearly unchanged when focusing by moving the first lens unit. However, an effective diameter of the first lens unit becomes the largest in the image pickup optical system and the weight of the first lens unit becomes heavier because incident height of an off-axis principal light at a wide angle end and an incident height of an off-axis light are the largest. Therefore, the zoom lens of Japanese Patent Laid-Open No. 11-202203 is not preferable as an image pickup lens for recording a video because load of the actuator becomes larger and driving noise becomes louder when focusing by moving the first lens unit, for example, driving noise is recorded when recording a video. Additionally, the zoom lens of Japanese Patent Laid-Open No. 11-202203 is not preferable because driving speed becomes slower during autofocus.

U.S. Pat. No. 8,068,281 discloses a zoom lens which includes a first lens unit having a positive refractive power, a second lens unit having a negative refractive power, a third lens unit having a negative refractive power, a fourth lens unit having a positive refractive power, a fifth lens unit having a negative refractive power and a sixth lens unit having a positive refractive power, and moves the fifth lens unit during focusing. However, a movement amount becomes larger during focusing and autofocus tends to become slower because incident height of an off axis light becomes smaller at a telephoto end and focus sensitivity becomes smaller in the fifth lens unit. Additionally, incident height of light to the fifth lens unit changes and further incident height of all lens units at an object side of the fifth lens unit changes when the fifth lens unit is moved during focusing. Especially, in a telephoto type zoom lens, incident height of an off-axis principal light incident to the first lens unit at a wide angle end and incident height of an off-axis light incident to the first lens unit at a telephoto end become larger. Therefore, when incident height of light is varied, variations of aberration relating to incident height become larger. In particular, field curvature at the wide angle side and spherical aberration at the telephoto side become larger.

Japanese Patent Laid-Open No. 2000-047107 discloses a zoom lens which includes a first lens unit having a positive refractive power, a second lens unit having a negative refractive power, a third lens unit having a positive refractive power, a fourth lens unit having a negative refractive power, a fifth lens unit having a positive refractive power and a sixth lens unit having a negative refractive power, and moves the fourth lens unit and the sixth lens unit during focusing. In particular, the sixth lens unit moves to an image side during focusing from infinity to minimum object distance so as to principally achieve focus effect and the fourth lens unit moves to an object side during focusing from infinity to minimum object distance so as to make variation of incident height of an off-axis principal light and variation of field curvature small at a wide angle side.

It is difficult to correct variations of spherical aberration at a telephoto side by moving the fourth lens unit. Additionally, a movement amount of the sixth lens unit becomes larger during focusing and autofocus tends to become slower because the fourth lens unit moves so as to negate focus effect of the sixth lens unit.

In the zoom lens of the present invention, a plurality of lens units move during focusing so as to solve each problem of a wide angle side and a telephoto side.

First, when a plurality of lens units move during focusing, two lens units having small effective diameter and being light are used as focus lens unit in the zoom lens of the present invention because load of the actuator becomes larger and driving noise becomes louder. In particular, two focus lens units are positioned at a position where light converges to an image side by a lens unit Lp having a positive refractive power positioned at an image side of a variable magnification lens unit (a variator) Lv. As a result, small and light two focus lens units can be achieved.

Next, moving two focus lens units in a direction where focus sensitivities of two focus lens units are added is the most effective so as to make driving amount during focusing at the wide angle side small. In other words, a lens unit having a positive refractive power moves to the object side and a lens unit having a negative refractive power moves to the image side during focusing from infinity to minimum object distance at a position of convergence light which is the image side relative to the lens unit Lp. For example, in Japanese Patent Laid-Open No. 2000-047107, the sixth lens unit having a negative refractive power moves to the image side and the fourth lens unit having a negative refractive power to the image side so as to add focus sensitivities of two focus lens units. Further, regarding two focus lens units, when a lens unit having a positive refractive power and a lens unit having a negative refractive power are combined, an influence to power arrangement of other lens units is small since their composite refractive power becomes weaker. Additionally, an extending amount of the focus lens unit becomes smaller and high speed focusing is easily performed since power of two focus lens unit increase at the same time and focus sensitivities synergistically increases.

Additionally, variation of spherical aberration easily become smaller since a movement amount of the focus lens unit becomes smaller and as a result, variation of incident height h of an off-axis light passing two focus lens units becomes smaller. Moreover, at the wide angle end, each moving direction of two focus lens units becomes the same by reversing either moving direction of two focus lens units having a positive refractive power and a negative refractive power, and as a result, variation of field curvature of other lens unit can be effectively corrected. The zoom lens of the present invention achieves correction of variation of field curvature at the wide angle end and correction of spherical aberration and reduction of an extending amount of the focus lens unit at the telephoto end.

Next, optimum lens constitution of the zoom lens of the present invention is described. The zoom lens of the present invention has a plurality of lens units having a negative refractive power and changes a distance between adjacent lens units during zooming. A lens unit Lv is a lens unit positioned at the most object side of the plurality of lens units having a negative refractive power, and a lens unit Lp is a lens unit positioned at the most object side of lens units that has a positive refractive power and is positioned at an image side of the lens unit Lv. fw represents a focal length of an entire system at the wide angle end and ft represents a focal length of an entire system at the telephoto end. And a focal length of an entire system at a wide angle range fwa and a focal length of an entire system at a telephoto range fta satisfy the following conditions:

$$Fw \leq fwa < (0.8 \times fw + 0.2 \times ft) \quad (1)$$

$$(0.8 \times fw + 0.2 \times ft) < fta \leq ft \quad (2)$$

Here, the first zoom range is at least a part of the wide angle range. The second zoom range is at least a part of the telephoto range. Then, a lens unit Fp having a positive refractive power and a lens unit Fn having a negative refractive power that are positioned at an image side of the lens unit Lp move during focusing. During focusing from infinity to minimum object distance, the lens unit Fp and the lens unit Fn move in the same direction in the first zoom range which is at least a part of the wide angle range.

The lens unit Fp moves to the object side and the lens unit Fn moves to the image side in the second zoom range which is at least a part of the telephoto range In each embodiment, in the first zoom range, variation of field curvature by moving one lens unit is effectively corrected by other lens unit by moving the lens unit Fn and the lens unit Fp in the same direction during focusing. Then, focus sensitivity is subtracted, but an influence to focus speed during autofocus is small even if a movement amount slightly increases because a movement amount of focusing at the wide angle end is fully smaller than a movement amount of focusing at the telephoto end.

Additionally, in the second zoom range, during focusing from infinity to minimum object distance, the lens unit Fp moves to the object side and the lens unit Fn moves to the image side. Since focus sensitivities of two focus lens unit can be added, a movement amount of focusing becomes smaller and focus speed increases during autofocus. Moreover, since a movement amount of the lens unit Fn becomes smaller and as a result, variation of incident height of an off-axis light becomes smaller, variation of spherical aberration becomes smaller in the telephoto range.

A main focus unit is a lens unit which has the same moving direction when focusing in the first zoom range and the second zoom range of the lens unit Fp and the lens unit Fn, and a floating unit is a lens unit which has the different moving direction when focusing in the first zoom range and the second zoom range of the lens unit Fp and the lens unit Fn.

In a rear focus of telephoto type zoom lens, variation of field curvature becomes larger at the wide angle range and variation of spherical aberration and focus driving amount become larger at the telephoto range by driving of the main focus unit. On the other hand, in the wide angle range, variation of spherical aberration and focus driving amount become smaller at the wide angle range and variation of field curvature becomes smaller at the telephoto range. Therefore, in intermediate zoom range, they all partially become smaller in permissible degree. If the driving amount of the floating lens unit at a zoom position where their balance become the best is zero, a driving direction of the floating unit may be reversed at the zoom position between the wide angle side and the telephoto side.

In each embodiment, by having the above constitutions, a zoom lens capable of making sound generated by moving the focusing lens unit smaller, easily performing high speed autofocus and having high optical performance in all zooming range and all object distances is achieved.

Next, when the zoom lens of each embodiment is constituted, a preferable constitution is described. The lens unit Fp and the lens unit Fn may move to the image side in the first zoom range, and the lens unit Fp may move to the object side and the lens unit Fn may move to the image side in the second zoom range. The lens unit Fp and the lens unit Fn of the two lens units for focusing, in order from the object side to the image side, may be arranged in that order.

A lens unit having strong negative refractive power is arranged on the image side and principal position is preferably moved to the object side so as to effectively acquire long focal length at the telephoto side. If the lens unit Fn and the lens unit Fp, in order from the object side to the image side, are arranged in that order, composite principal position of the lens unit Fn and the lens unit Fp is close to the image side. Therefore, load of other lens unit increases, power arrangement is inefficient and it is difficult to correct aberration variation during zooming so as to approach a focal length of an entire system at the telephoto side to the object side. Meanwhile, it is easy to decrease aberration variation of focusing by using focusing type of each embodiment.

Next, preferable conditions are described. βFpt represents a lateral magnification of the lens unit Fp at the telephoto end. Dfmw represents a movement amount of the main focus unit when focusing from infinity to minimum object distance at the wide angle end and dflw represents a movement amount of the floating unit when focusing from infinity to minimum object distance at the wide angle end. Dfmt represents a movement amount of the main focus unit when focusing from infinity to minimum object distance at the telephoto end and dflt represents a movement amount of the floating unit when focusing from infinity to minimum object distance at the telephoto end. fLv represents a focal length of the lens unit Lv, fLp represents a focal length of the lens unit Lp, fFp represents a focal length of the lens unit Fp and fFn represents a focal length of the lens unit Fn.

At this time, it is preferred that at least one following conditions are satisfied:

$$-0.5 < \beta Fpt < 0.8 \quad (3)$$

$$0.8 < Dfmw/Dflw < 2.0 \quad (4)$$

$$-4.00 < Dfmt/Dflt < -0.25 \quad (5)$$

$$0.3 < |fFp/fFn| < 3.0 \quad (6)$$

$$0.05 < |fLv/ft| < 0.20 \quad (7)$$

$$0.06 < fLp/ft < 0.25 \quad (8)$$

$$0.08 < fFp/ft < 0.30 \quad (9)$$

$$0.05 < |fFn/ft| < 0.40 \quad (10)$$

Here, a movement amount from the object side to the image side is defined as positive.

Next, technological meaning of each condition is described.

The condition (3) is a condition so as to properly acquire focus sensitivities of the lens unit Fp and make both movement amounts of focusing of the lens unit Fp and the lens unit Fn smaller. It is preferable that the condition (3) is satisfied whether the lens unit Fp is the main focus unit or the floating unit. If the upper limit of the condition (3) is deviated, focus sensitivities of the lens unit Fp becomes smaller and a movement amount of the lens unit Fp and the lens unit Fn becomes larger since the lateral magnification is close to the same magnification.

If the lower limit of the condition (3) is deviated, optical performance degrades since a positive refractive power of the lens unit Fp is too strong and as a result, a refractive power of a variator (variable magnification lens unit) needs to be strong so as to acquire long focal length at the telephoto end. It is further preferred that the condition (3) satisfies the following condition (3a).

$$-0.4 < \beta Fpt < 0.6 \quad (3a)$$

The condition (4) relates to a relationship of focusing drive of the lens unit Fp and the lens unit Fn, and is used for successfully correcting field curvature at the wide angle end. If the upper limit of the condition (4) is deviated, it is not preferred since movement of the floating unit is too small compared with movement of the main focus unit and correction effect of field curvature weakens.

If the lower limit of the condition (4) is deviated, it is not preferred since movement of the floating unit is too large compared with movement of the main focus unit, composite focus sensitivities of two focus lens units becomes smaller and a movement amount becomes larger. It is further preferred that the condition (4) satisfies the following condition (4a).

$$0.9 < Dfmw/Dflw < 1.8 \quad (4a)$$

The condition (5) relates to a relationship of focusing drive of the lens unit Fp and the lens unit Fn, and is used for successfully making a movement amount of focusing small. If the upper limit of the condition (5) is deviated, it is not preferred since movement of the main focus unit becomes smaller, but movement of the floating unit becomes too large. If the lower limit of the condition (5) is deviated, it is not preferred since movement of the main focus unit becomes larger. It is further preferred that the condition (5) satisfies the following condition (5a).

$$-3.0 < Dfmt/Dflt < -0.3 \quad (5a)$$

The condition (6) prescribes a ratio of focal length of the lens unit Fp and the lens unit Fn. The condition (6) is a condition so as to properly set refractive power arrangements of the lens unit Fp and the lens unit Fn, properly maintain a composite refractive power after the lens unit Lv, and effectively acquire focus sensitivities of the lens unit Fp and the lens unit Fn. If the lower limit of the condition (6) is deviated, focusing driving amounts becomes larger since a refractive power of the lens unit Fn is too weak or a positive refractive power of rear unit becomes stronger since a refractive power of the lens unit Fp is too strong. Therefore, optical performance degrades since a refractive power of the variator need to be strong though a focal length becomes longer at the telephoto end.

If the upper limit of the condition (6) is deviated, focusing driving amounts of the lens unit Fn becomes larger since a refractive power of the lens unit Fp is too weak or a negative refractive power of rear unit becomes stronger since a refractive power of the lens unit Fn is too strong. Therefore, it is difficult to shorten a focal length at the wide angle end. It is further preferred that the condition (6) satisfies the following condition (6a).

$$0.4 < |fFp/fFn| < 2.5 \quad (6a)$$

The conditions (7) (8), (9) and (10) are conditions so as to achieve decrease of aberration variation by zooming and miniaturization of the entire system. If the upper limit of the conditions (7) (8), (9) and (10) are deviated, the entire system grows in size, and if the lower limit of the conditions (7) (8), (9) and (10) is deviated, aberration variation by zooming becomes larger since a refractive power of each lens unit is too strong. It is further preferred that the conditions (7) (8), (9) and (10) satisfy the following conditions (7a), (8a), (9a) and (10a).

$$0.07 < |fLv/ft| < 0.18 \quad (7a)$$

$$0.08 < fLp/ft < 0.22 \quad (8a)$$

$$0.09 < fFp/ft < 0.25 \quad (9a)$$

$$0.07 < |fFn/ft| < 0.30 \quad (10a)$$

In each embodiment, it is preferred that the lens unit Fn having a negative refractive power may be moved not only by focusing but also by zooming.

In particular, at the wide angle end, the lens unit Fn may be arranged at the image side so as to approach a principal position of the entire system, and at the telephoto end, the lens unit Fn may be arranged at the object side so as to increase focus sensitivity. Therefore, the lens unit Fn may be moved to the object side during zooming from the wide angle end to the telephoto end.

Next, the lens unit Fp having a positive refractive power may be moved not only by focusing but also by zooming. In particular, the lens unit Fp may be also moved to the object side during zooming from the wide angle end to the telephoto end so as to compensate variations of spherical aberration by moving the lens unit Fn to the object side.

Next, it is preferred that the lens unit Fp and the lens unit Fn having a negative refractive power may have not more than two lenses so as to become light lens unit. Additionally, in each embodiment, the lens unit which moves during focusing may be only the lens unit Fp and the lens unit Fn. As a result, load to the actuator for focusing drive is decreased and silent and high speed focus is facilitated.

Next, for example, the zoom lens of each embodiment includes, in order from the object side, lens units having positive, negative, positive, positive and negative refractive powers, the fourth lens unit may become the lens unit Fp and the fifth lens unit may become the lens unit Fn. In addition, the zoom lens includes, in order from the object side, lens units having positive, negative, positive, negative, positive and negative refractive powers, the fifth lens unit may become the lens unit Fp and the sixth lens unit may become the lens unit Fn. The zoom lens of each embodiment is from a surface which changes a distance to foreground or a lens adjacent to forward by zooming or focusing to a surface which changes a distance to background or a lens adjacent to backward by zooming or focusing.

Hereafter, the lens constitution of each embodiment is described. The zoom lens of the first embodiment includes, in order from the object side to the image side, a first lens unit L1 having a positive refractive power, a second lens unit L2 having a negative refractive power, a third lens unit L3 having the aperture stop SP and a positive refractive power and a fourth lens unit L4 having a negative refractive power. Further, the zoom lens includes a fifth lens unit L5 having a positive refractive power, a sixth lens unit L6 having a negative refractive power, and a seventh lens unit L7 having a positive refractive power.

The second lens unit L2 and the seventh lens unit L7 are fixed, and the first lens unit L1 and the third lens unit L3 through the sixth lens unit L6 move to the object side during zooming from the wide angle end to the telephoto end. Additionally, the second lens unit L2 and the third lens unit L3 respectively correspond to the lens unit Lv and the lens unit Lp, and the fifth lens unit L5 and the sixth lens unit L6 positioned at the image side of them respectively correspond to the lens unit Fp and the lens unit Fn. The lens unit Fn is the main focus unit and the lens unit Fp is the floating unit.

The lens unit Fn moves to the image side in the entire range of the wide angle range and the telephoto range during focusing from infinity to minimum object distance. The lens unit Fp moves to the image side in the entire wide angle range and moves to the object side in the entire telephoto range. Therefore, high performance is achieved in the entire zoom range from the wide angle end to the telephoto end and in the entire object distance from infinity to the object distance of 1.2 m (when a numerical example is described, unit "mm" is used. The same applies to the following).

The lateral magnification of the lens unit Fp at the telephoto end satisfies the condition (3), and as a result, focus sensitivity of the lens unit Fp at the telephoto end is properly acquired and both movement amounts of focusing of the lens unit Fp and the lens unit Fn reduce. Additionally, a movement amount of focusing of the lens unit Fp and the lens unit Fn at the wide angle end satisfies the condition (4), and therefore, variation of field curvature on the object distance at the wide angle end are lowered.

Additionally, a movement amount of focusing of the lens unit Fp and the lens unit Fn at the telephoto side satisfies the condition (5), and therefore, both movement amounts of focusing of the lens unit Fp and the lens unit Fn are lowered. Moreover, high speed movement during autofocus can be achieved and also variation of spherical aberration by object distance decreases.

Ratio of a focal length of the lens unit Fp and the lens unit Fn satisfies the condition (6), and as a result, power of composite lens unit positioned at the image side relative to the lens unit Lp is properly maintained and focus sensitivity of the lens unit Fp and the lens unit Fn is effectively acquired. Additionally, both the lens unit Fp and the lens unit Fn have one lens, and as a result, load to the actuator is decreased and silent and high speed focus is facilitated. Moreover, the lens unit Lv, the lens unit Lp, the lens unit Fn and the lens unit Fp respectively satisfy the conditions (7), (8), (9) and (10) so as to achieve decrease of aberration variation by zooming of the entire system and miniaturization of the entire system.

The zoom lens of the second embodiment includes, in order from the object side to the image side, a first lens unit L1 having a positive refractive power, a second lens unit L2 having a negative refractive power, a third lens unit L3 having the aperture stop SP and a positive refractive power and a fourth lens unit L4 having a negative refractive power. Further, the zoom lens includes a fifth lens unit L5 having a negative refractive power and a sixth lens unit L6 having a positive refractive power. The second lens unit L2 and the sixth lens unit L6 are fixed and the third lens unit L3 through the fifth lens unit L5 move to the object side during zooming from the wide angle end to the telephoto end.

Additionally, the second lens unit L2 and the third lens unit L3 respectively correspond to the lens unit Lv and the lens unit Lp, and the fourth lens unit L4 and the fifth lens unit L5 positioned at the image side of them respectively correspond to the lens unit Fp and the lens unit Fn. The lens unit Fn is the main focus unit and the lens unit Fp is the floating unit.

The lens unit Fn moves to the image side in the entire range of the wide angle range and the telephoto range during focusing from infinity to minimum object distance. The lens unit Fp moves to the image side in the entire wide angle range and moves to the object side in the entire telephoto range. Therefore, high performance is achieved in the entire zoom range from the wide angle end to the telephoto end and in the entire object distance from infinity to the object distance of 1.2 m.

The operation of each lens unit is the same as first lens unit. Zoom type, focusing type, and optical operation of each lens unit of the third embodiment are the same as the second embodiment. Zoom type of the fourth embodiment is the same as the first embodiment. Focusing type of fourth embodiment is different from the first embodiment. The second lens unit L2 and the third lens unit L3 respectively correspond to the lens unit Lv and the lens unit Lp, and the fifth lens unit L5 and the sixth lens unit L6 positioned at the image side of them respectively correspond to the lens unit Fp and the lens unit Fn. The lens unit Fp is the main focus unit and the lens unit Fn is the floating unit.

The lens unit Fp moves to the object side in the entire range of the wide angle range and the telephoto range during focusing from infinity to minimum object distance. The lens unit Fn moves to the object side in the entire wide angle range and moves to the image side in the entire telephoto range. Therefore, high performance is achieved in the entire zoom range from the wide angle end to the telephoto end and in the entire object distance from infinity to the object distance of 1.2 m.

The differences with the first embodiment are changing the main focus unit and the floating unit and reversing driving direction. The present invention can be applied to the above zoom lens. Effect of each lens unit is the same as the first embodiment. Zoom type, focusing type and optical operation of each lens unit are the same as the first embodiment.

In this embodiment, the lens unit Fp moves to the image side in the entire range of the wide angle range and the telephoto range during focusing from infinity to minimum object distance. The lens unit Fn moves to the image side in the entire wide angle range and moves to the object side in the entire telephoto range. Therefore, high performance is achieved in the entire zoom range from the wide angle end to the telephoto end and in the entire object distance from infinity to the object distance of 1.9 m.

The zoom lens of the sixth embodiment includes, in order from the object side to the image side, a first lens unit L1 having a positive refractive power, a second lens unit L2 having a negative refractive power, a third lens unit L3 having the aperture stop SP and a positive refractive power, a fourth lens unit L4 having a negative refractive power and a fifth lens unit L5 having a negative refractive power. The second lens unit L2 is fixed, and the first lens unit L1 and third lens unit L3 through the fifth lens unit L5 move to the object side during zooming from the wide angle end to the telephoto end.

Additionally, the second lens unit L2 and the third lens unit L3 respectively correspond to the lens unit Lv and the lens unit Lp, and the fourth lens unit L4 and the fifth lens unit L5 positioned at the image side of them respectively correspond to the lens unit Fp and the lens unit Fn. The lens unit Fp is the main focus unit and the lens unit Fn is the floating unit.

The lens unit Fp moves to the object side in the entire range of the wide angle range and the telephoto range during focusing from infinity to minimum object distance. The lens unit Fn moves to the object side in the entire wide angle range and moves to the image side in the entire telephoto range. Therefore, high performance is achieved in the entire zoom range from the wide angle end to the telephoto end and in the entire object distance from infinity to the object distance of 1.9 m.

Next, the embodiment applying the zoom lens illustrated in the first embodiment through the sixth embodiment to an image pickup apparatus is described in reference to FIG. 19. The image pickup apparatus of the present invention includes an interchangeable lens apparatus including a zoom lens, and a camera body detachably coupled to the interchangeable lens through a camera mount and including an image pickup element which receives an optical image formed by the zoom lens and converts into an electrical image signal.

FIG. 19 is a schematic diagram of a main part of a single lens reflex camera. In FIG. 19, reference 10 denotes an image pickup lens including a zoom lens of the first embodiment through the sixth embodiment. A zoom lens 1 is hold by a lens barrel 2 which is a holding member. Reference 20 denotes a camera body, and the camera body 20 comprises a quick return mirror 3 upward reflecting a light from the image pickup lens 10 and a focusing screen 4 arranged in an image forming position of the image pickup lens 10. Further, the camera body 20 comprises a penta dach prism 5 which converts an inverse image formed on the focusing screen 4 into an erected image and an ocular lens 6 so as to observe the erected image.

Reference 7 denotes a light sensitive surface, and a solid image pickup element (a photoelectric conversion element) such as a CCD sensor and a CMOS sensor receiving an image formed by the zoom lens and a silver-halide film are arranged in the light sensitive surface 7. The quick return mirror 3 is evacuated from a light path when taking an image and an image is formed on the light sensitive surface 7 by the image pickup lens 10. The image pickup apparatus disclosed in the embodiment enjoys the effect described from the first embodiment through the sixth embodiment. Additionally, the zoom lens of the present invention is also able to be applied to a mirrorless camera which does not have a quick return mirror. Further, the zoom lens of the present invention is able to be applied to an image projection optical system for a projector.

Hereinafter, numerical examples 1 to 6 corresponding to the first embodiment through the sixth embodiment are indicated. In each numerical example, i represents an optical surface number counted from the object side. In numerical examples, ri represents a curvature radius of an i-th lens surface in order from the object side, di represents an i-th lens thickness and an air gap of the i-th lens surface in order from the object side. ndi and vdi respectively represent a refractive index and an Abbe number of an i-th lens material in order from the object side. BF represents a back focus.

Additionally, in addition to specs such as a focal length and F number, an image height is maximum image height deciding a half angle of view, and the entire length of the lens is a distance from the first lens surface to the image surface. The back focus BF indicates a distance from the last surface to the image surface. Additionally, each lens unit data represents a focal length of each lens unit, a length on the optical axis, a front side principal position and a rear side principal position. Moreover, a part where a gap d of each optical surface is variable changes during zooming, and surface separations according to the focal length are written in another table.

Calculate results of each condition based on lens data of numerical examples 1 through 6 described below are written in Table 1.

Numerical Example 1 unit mm

Surface data

| Surface number | r | d | nd | vd | effective diameter |
|---|---|---|---|---|---|
| 1 | 69.789 | 4.08 | 1.51633 | 64.1 | 41.79 |
| 2 | 296.524 | 0.15 | | | 41.44 |
| 3 | 62.810 | 2.10 | 1.80100 | 35.0 | 40.71 |
| 4 | 39.910 | 6.76 | 1.49700 | 81.5 | 39.02 |
| 5 | 575.839 | (variable) | | | 38.39 |
| 6 | 520.703 | 1.10 | 1.74400 | 44.8 | 20.00 |
| 7 | 16.401 | 3.76 | 1.84666 | 23.8 | 18.96 |
| 8 | 40.501 | 1.74 | | | 18.38 |
| 9 | −70.023 | 1.00 | 1.83400 | 37.2 | 18.37 |
| 10 | 61.725 | (variable) | | | 18.40 |
| 11 | 56.219 | 3.10 | 1.85026 | 32.3 | 21.37 |
| 12 | −89.371 | 2.42 | | | 21.34 |
| 13 | 38.322 | 4.83 | 1.60311 | 60.6 | 20.24 |
| 14 | −50.433 | 1.20 | 1.85026 | 32.3 | 19.34 |
| 15 | 267.258 | 1.58 | | | 18.76 |
| 16(diaphragm) | ∞ | (variable) | | | 18.06 |
| 17 | 25.748 | 3.77 | 1.48749 | 70.2 | 17.33 |
| 18 | −73.244 | 1.10 | 1.74077 | 27.8 | 16.41 |
| 19 | 21.647 | (variable) | | | 15.32 |
| 20 | 39.345 | 1.74 | 1.78590 | 44.2 | 15.20 |
| 21 | −288.507 | (variable) | | | 15.21 |
| 22 | 440.795 | 0.80 | 1.83400 | 37.2 | 15.12 |
| 23 | 27.091 | (variable) | | | 15.07 |
| 24 | −187.643 | 3.42 | 1.84666 | 23.8 | 27.39 |
| 25 | −46.932 | | | | 27.89 |

Various data
Zoom ratio 4.24

| | Wide angle | Intermediate | Telephoto |
|---|---|---|---|
| Focal length | 56.90 | 133.00 | 241.28 |
| F number | 4.12 | 5.04 | 5.83 |
| Half angle of view (degree) | 13.50 | 5.86 | 3.24 |
| Image height | 13.66 | 13.66 | 13.66 |
| Lens overall length | 154.33 | 176.38 | 191.20 |
| BF | 41.21 | 41.21 | 41.22 |
| d5 | 5.20 | 27.26 | 42.26 |
| d10 | 32.39 | 13.97 | 1.50 |
| d16 | 0.59 | 2.58 | 1.50 |
| d19 | 14.56 | 5.81 | 24.48 |
| d21 | 2.24 | 5.67 | 1.84 |
| d23 | 13.49 | 35.25 | 33.77 |

Zoom lens unit data

| Unit | Starting surface | Focal length | Lens constitution length |
|---|---|---|---|
| 1 | 1 | 99.03 | 13.09 |
| 2 | 6 | −25.89 | 7.60 |
| 3 | 11 | 30.84 | 13.12 |
| 4 | 17 | −60.25 | 4.87 |
| 5 | 20 | 44.16 | 1.74 |
| 6 | 22 | −34.64 | 0.80 |
| 7 | 24 | 73.11 | 3.42 |

| Unit | Front side principal position | Rear side principal position |
|---|---|---|
| 1 | −0.60 | −9.02 |
| 2 | 4.50 | −0.50 |
| 3 | 0.70 | −8.48 |
| 4 | 7.07 | 3.49 |
| 5 | 0.12 | −0.86 |

-continued

| unit mm | | |
|---|---|---|
| 6 | 0.47 | 0.03 |
| 7 | 2.44 | 0.61 |

Numerical Example 2

| unit mm | | | | |
|---|---|---|---|---|
| Surface data | | | | |
| Surface number | r | d | nd | vd | effective diameter |
|---|---|---|---|---|---|
| 1 | 63.334 | 4.89 | 1.51633 | 64.1 | 44.79 |
| 2 | 308.921 | 0.15 | | | 44.40 |
| 3 | 62.008 | 2.10 | 1.80100 | 35.0 | 43.28 |
| 4 | 37.768 | 7.53 | 1.49700 | 81.5 | 41.08 |
| 5 | 396.426 | (variable) | | | 40.50 |
| 6 | −743.921 | 1.10 | 1.74320 | 49.3 | 19.55 |
| 7 | 16.904 | 3.68 | 1.84666 | 23.8 | 18.59 |
| 8 | 42.576 | 1.85 | | | 18.01 |
| 9 | −64.219 | 1.00 | 1.83400 | 37.2 | 17.95 |
| 10 | 69.460 | (variable) | | | 18.02 |
| 11 | 157.651 | 2.58 | 1.77250 | 49.6 | 22.32 |
| 12 | −83.722 | 0.15 | | | 22.39 |
| 13 | 39.900 | 13.02 | 1.60311 | 60.6 | 22.05 |
| 14 | −253.552 | 1.58 | | | 19.06 |
| 15(diaphragm) | ∞ | 0.59 | | | 18.42 |
| 16 | 21.981 | 3.70 | 1.51633 | 64.1 | 17.55 |
| 17 | −83.210 | 1.10 | 1.80000 | 29.8 | 16.88 |
| 18 | 21.802 | (variable) | | | 15.70 |
| 19 | 39.187 | 1.59 | 1.77250 | 49.6 | 14.54 |
| 20 | −609.654 | (variable) | | | 14.56 |
| 21 | 2410.848 | 0.80 | 1.77250 | 49.6 | 14.59 |
| 22 | 26.893 | (variable) | | | 14.61 |
| 23 | −363.274 | 3.64 | 1.68893 | 31.1 | 26.00 |
| 24 | −43.225 | | | | 26.47 |

Various data
Zoom ratio 4.24

| | Wide angle | Intermediate | Telephoto |
|---|---|---|---|
| Focal length | 56.85 | 132.92 | 241.17 |
| F NUMBER | 4.11 | 4.27 | 5.75 |
| Half angle of view (degree) | 13.51 | 5.87 | 3.24 |
| Image height | 13.66 | 13.66 | 13.66 |
| Lens overall length | 152.67 | 184.90 | 191.90 |
| BF | 39.93 | 39.93 | 39.92 |
| d5 | 2.20 | 34.61 | 41.61 |
| d10 | 28.88 | 18.42 | 1.50 |
| d18 | 10.02 | 5.27 | 25.78 |
| d20 | 4.85 | 1.95 | 1.95 |
| d22 | 15.75 | 33.69 | 30.11 |

Zoom lens unit data

| Unit | Starting surface | Focal length | Lens constitution length |
|---|---|---|---|
| 1 | 1 | 96.90 | 14.67 |
| 2 | 6 | −24.89 | 7.63 |
| 3 | 11 | 39.99 | 22.72 |
| 4 | 19 | 47.72 | 1.59 |
| 5 | 21 | −35.21 | 0.80 |
| 6 | 23 | 70.89 | 3.64 |

| Unit | Front side principal position | Rear side principal position |
|---|---|---|
| 1 | −0.96 | −10.38 |
| 2 | 4.21 | −0.81 |
| 3 | −8.48 | −18.16 |
| 4 | 0.05 | −0.84 |

-continued

| unit mm | | |
|---|---|---|
| 5 | 0.46 | 0.01 |
| 6 | 2.43 | 0.29 |

Numerical Example 3

| unit mm | | | | |
|---|---|---|---|---|
| Surface data | | | | |
| Surface number | r | d | nd | vd | effective diameter |
|---|---|---|---|---|---|
| 1 | 72.829 | 3.81 | 1.51633 | 64.1 | 42.13 |
| 2 | 238.665 | 0.15 | | | 41.78 |
| 3 | 64.852 | 2.10 | 1.80100 | 35.0 | 41.16 |
| 4 | 42.038 | 6.75 | 1.49700 | 81.5 | 39.58 |
| 5 | 931.791 | (variable) | | | 38.98 |
| 6 | 2009.360 | 1.10 | 1.77250 | 49.6 | 20.04 |
| 7 | 17.774 | 3.51 | 1.84666 | 23.8 | 19.14 |
| 8 | 40.993 | 1.86 | | | 18.66 |
| 9 | −62.549 | 1.00 | 1.83400 | 37.2 | 18.65 |
| 10 | 101.036 | (variable) | | | 18.81 |
| 11 | 60.919 | 3.19 | 1.80100 | 35.0 | 22.57 |
| 12 | −75.594 | 3.58 | | | 22.49 |
| 13 | 35.527 | 3.80 | 1.60311 | 60.6 | 20.84 |
| 14 | −51.201 | 1.20 | 1.90366 | 31.3 | 20.39 |
| 15 | 229.444 | 1.58 | | | 19.77 |
| 16(diaphragm) | ∞ | 0.59 | | | 19.24 |
| 17 | 19.967 | 3.96 | 1.56384 | 60.7 | 18.19 |
| 18 | −136.367 | 1.10 | 1.71736 | 29.5 | 17.32 |
| 19 | 17.065 | (variable) | | | 15.62 |
| 20 | 28.951 | 1.97 | 1.59551 | 39.2 | 14.46 |
| 21 | −157.459 | (variable) | | | 14.23 |
| 22 | −132.298 | 2.11 | 1.84666 | 23.8 | 13.14 |
| 23 | −15.566 | 0.80 | 1.80000 | 29.8 | 12.96 |
| 24 | 22.841 | (variable) | | | 12.27 |
| 25 | 625.820 | 3.11 | 1.67270 | 32.1 | 27.56 |
| 26 | −47.594 | | | | 27.77 |

Various data
Zoom ratio 4.24

| | Wide angle | Intermediate | Telephoto |
|---|---|---|---|
| Focal length | 56.90 | 133.00 | 241.28 |
| F NUMBER | 4.12 | 5.21 | 5.81 |
| Half angle of view (degree) | 13.50 | 5.86 | 3.24 |
| Image height | 13.66 | 13.66 | 13.66 |
| Lens overall length | 148.35 | 176.32 | 191.26 |
| BF | 41.20 | 41.20 | 41.20 |
| d5 | 2.04 | 30.06 | 45.06 |
| d10 | 29.90 | 12.98 | 1.50 |
| d19 | 7.24 | 1.64 | 16.79 |
| d21 | 2.00 | 5.20 | 2.01 |
| d24 | 18.72 | 37.98 | 37.45 |

Zoom lens unit data

| Unit | Starting surface | Focal length | Lens constitution length |
|---|---|---|---|
| 1 | 1 | 103.68 | 12.81 |
| 2 | 6 | −26.26 | 7.47 |
| 3 | 11 | 36.81 | 18.99 |
| 4 | 20 | 41.23 | 1.97 |
| 5 | 22 | −25.83 | 2.91 |
| 6 | 25 | 65.87 | 3.11 |

| Unit | Front side principal position | Rear side principal position |
|---|---|---|
| 1 | −0.46 | −8.73 |
| 2 | 3.96 | −0.97 |

-continued

| unit mm | | |
|---|---|---|
| 3 | −7.73 | −16.51 |
| 4 | 0.19 | −1.05 |
| 5 | 1.35 | −0.23 |
| 6 | 1.73 | −0.13 |

Numerical Example 4

| unit mm | | | | |
|---|---|---|---|---|
| Surface data | | | | |
| Surface number | r | d | nd | vd | effective diameter |
|---|---|---|---|---|---|
| 1 | 70.622 | 3.69 | 1.51633 | 64.1 | 41.38 |
| 2 | 208.414 | 0.15 | | | 41.05 |
| 3 | 58.529 | 2.10 | 1.80100 | 35.0 | 40.51 |
| 4 | 39.816 | 6.72 | 1.49700 | 81.5 | 38.96 |
| 5 | 511.322 | (variable) | | | 38.36 |
| 6 | 991.362 | 1.10 | 1.80400 | 46.6 | 20.00 |
| 7 | 18.473 | 3.35 | 1.84666 | 23.8 | 19.09 |
| 8 | 39.752 | 1.71 | | | 18.62 |
| 9 | −87.331 | 1.00 | 1.83400 | 37.2 | 18.61 |
| 10 | 85.325 | (variable) | | | 18.71 |
| 11 | 60.659 | 4.73 | 1.84666 | 23.8 | 24.25 |
| 12 | −74.273 | 0.15 | | | 24.03 |
| 13 | 35.254 | 3.73 | 1.60311 | 60.6 | 22.68 |
| 14 | −62.853 | 1.20 | 1.84666 | 23.8 | 22.22 |
| 15 | 116.753 | 1.58 | | | 21.13 |
| 16(diaphragm) | ∞ | (variable) | | | 20.10 |
| 17 | 22.651 | 3.79 | 1.48749 | 70.2 | 18.93 |
| 18 | −84.105 | 1.10 | 1.76182 | 26.5 | 18.20 |
| 19 | 20.881 | (variable) | | | 16.66 |
| 20 | 33.723 | 2.05 | 1.65412 | 39.7 | 15.15 |
| 21 | −95.925 | (variable) | | | 14.92 |
| 22 | −115.171 | 2.34 | 1.84666 | 23.8 | 14.22 |
| 23 | −15.973 | 0.80 | 1.80000 | 29.8 | 14.15 |
| 24 | 24.052 | (variable) | | | 14.04 |
| 25 | −234.959 | 2.76 | 1.69895 | 30.1 | 26.22 |
| 26 | −39.951 | | | | 26.47 |

| Various data | | | |
|---|---|---|---|
| Zoom ratio 4.24 | | | |
| | Wide angle | Intermediate | Telephoto |
| Focal length | 56.90 | 132.97 | 241.28 |
| F NUMBER | 4.15 | 5.12 | 5.83 |
| Half angle of view (degree) | 13.50 | 5.87 | 3.24 |
| Image height | 13.66 | 13.66 | 13.66 |
| Lens overall length | 151.20 | 176.31 | 191.18 |
| BF | 49.77 | 49.74 | 49.70 |
| d5 | 2.55 | 27.63 | 42.63 |
| d10 | 33.52 | 14.01 | 1.50 |
| d16 | 0.59 | 2.16 | 2.11 |
| d19 | 12.21 | 3.37 | 19.18 |
| d21 | 1.93 | 5.15 | 1.93 |
| d24 | 6.57 | 30.17 | 30.07 |

| Zoom lens unit data | | | |
|---|---|---|---|
| Unit | Starting surface | Focal length | Lens constitution length |
| 1 | 1 | 99.07 | 12.66 |
| 2 | 6 | −26.32 | 7.16 |
| 3 | 11 | 31.31 | 11.39 |
| 4 | 17 | −64.00 | 4.89 |
| 5 | 20 | 38.39 | 2.05 |
| 6 | 22 | −26.29 | 3.14 |
| 7 | 25 | 68.47 | 2.76 |

-continued

| unit mm | | |
|---|---|---|
| Unit | Front side principal position | Rear side principal position |
| 1 | −0.69 | −8.83 |
| 2 | 3.62 | −1.05 |
| 3 | 0.53 | −6.60 |
| 4 | 7.94 | 4.24 |
| 5 | 0.33 | −0.92 |
| 6 | 1.40 | −0.30 |
| 7 | 1.95 | 0.33 |

Numerical Example 5

| unit mm | | | | | |
|---|---|---|---|---|---|
| Surface data | | | | | |
| Surface number | r | d | nd | vd | effective diameter |
| 1 | 94.813 | 6.52 | 1.57099 | 50.8 | 67.95 |
| 2 | 422.715 | 0.15 | | | 67.47 |
| 3 | 109.053 | 2.20 | 1.74950 | 35.3 | 66.04 |
| 4 | 59.681 | 10.17 | 1.43875 | 94.9 | 63.17 |
| 5 | 566.400 | (variable) | | | 62.56 |
| 6 | −686.443 | 1.76 | 1.77250 | 49.6 | 31.15 |
| 7 | 28.817 | 4.54 | 1.84666 | 23.8 | 29.94 |
| 8 | 73.710 | 2.96 | | | 29.51 |
| 9 | −75.702 | 1.50 | 1.72000 | 43.7 | 29.50 |
| 10 | 174.161 | (variable) | | | 29.91 |
| 11 | 120.834 | 3.79 | 1.83400 | 37.2 | 32.36 |
| 12 | −118.046 | 6.74 | | | 32.36 |
| 13 | 62.033 | 6.24 | 1.59522 | 67.7 | 30.89 |
| 14 | −74.639 | 1.60 | 1.85026 | 32.3 | 30.16 |
| 15 | −1970.134 | 2.53 | | | 29.61 |
| 16(diaphragm) | ∞ | (variable) | | | 28.40 |
| 17 | 38.493 | 7.22 | 1.48749 | 70.2 | 27.56 |
| 18 | −190.866 | 1.40 | 1.69895 | 30.1 | 25.61 |
| 19 | 33.247 | (variable) | | | 24.01 |
| 20 | 64.310 | 2.53 | 1.77250 | 49.6 | 23.31 |
| 21 | −977.398 | (variable) | | | 23.30 |
| 22 | 864.424 | 1.20 | 1.77250 | 49.6 | 22.99 |
| 23 | 45.569 | (variable) | | | 22.88 |
| 24 | −191.698 | 3.39 | 1.84666 | 23.8 | 40.36 |
| 25 | −76.672 | | | | 40.81 |

| Various data | | | |
|---|---|---|---|
| Zoom ratio 3.73 | | | |
| | Wide angle | Intermediate | Telephoto |
| Focal length | 104.59 | 199.99 | 389.99 |
| F NUMBER | 4.58 | 5.03 | 5.87 |
| Half angle of view (degree) | 11.69 | 6.17 | 3.18 |
| Image height | 21.64 | 21.64 | 21.64 |
| Lens overall length | 245.09 | 285.06 | 308.91 |
| BF | 68.73 | 68.73 | 68.73 |
| d5 | 14.41 | 54.38 | 78.38 |
| d10 | 40.29 | 23.83 | 1.50 |
| d16 | 0.94 | 2.64 | 2.17 |
| d19 | 17.24 | 2.06 | 38.19 |
| d21 | 1.86 | 3.37 | 1.86 |
| d23 | 35.17 | 63.61 | 51.65 |

| Zoom lens unit data | | | |
|---|---|---|---|
| Unit | Starting surface | Focal length | Lens constitution length |
| 1 | 1 | 175.61 | 19.05 |
| 2 | 6 | −41.50 | 10.76 |
| 3 | 11 | 49.95 | 20.90 |
| 4 | 17 | −126.50 | 8.62 |

-continued unit mm

| | | | |
|---|---|---|---|
| 5 | 20 | 78.19 | 2.53 |
| 6 | 22 | −62.31 | 1.20 |
| 7 | 24 | 148.91 | 3.39 |

| Unit | Front side principal position | Rear side principal position |
|---|---|---|
| 1 | −2.57 | −14.98 |
| 2 | 5.39 | −1.84 |
| 3 | 3.10 | −13.14 |
| 4 | 15.79 | 8.99 |
| 5 | 0.09 | −1.34 |
| 6 | 0.72 | 0.04 |
| 7 | 3.02 | 1.21 |

Numerical Example 6 unit mm

Surface data

| Surface number | r | d | nd | νd | effective diameter |
|---|---|---|---|---|---|
| 1 | 104.620 | 6.50 | 1.57099 | 50.8 | 66.89 |
| 2 | 917.776 | 0.15 | | | 66.51 |
| 3 | 123.600 | 2.20 | 1.74950 | 35.3 | 65.17 |
| 4 | 62.830 | 9.78 | 1.43875 | 94.9 | 62.53 |
| 5 | 866.066 | (variable) | | | 61.96 |
| 6 | −257.014 | 1.76 | 1.69680 | 55.5 | 32.00 |
| 7 | 32.999 | 3.98 | 1.84666 | 23.8 | 30.97 |
| 8 | 70.298 | 3.36 | | | 30.54 |
| 9 | −67.975 | 1.50 | 1.77250 | 49.6 | 30.54 |
| 10 | 534.473 | (variable) | | | 31.11 |
| 11 | 186.550 | 3.60 | 1.77250 | 49.6 | 33.92 |
| 12 | −143.160 | 4.61 | | | 33.98 |
| 13 | 48.728 | 7.51 | 1.59522 | 67.7 | 33.29 |
| 14 | −86.189 | 1.60 | 1.83400 | 37.2 | 32.38 |
| 15 | −266.679 | 2.53 | | | 31.89 |
| 16(diaphragm) | ∞ | 0.94 | | | 30.52 |
| 17 | 38.205 | 11.26 | 1.48749 | 70.2 | 28.82 |
| 18 | −242.365 | 1.40 | 1.83400 | 37.2 | 24.20 |
| 19 | 28.983 | (variable) | | | 22.48 |
| 20 | 84.266 | 2.47 | 1.60311 | 60.6 | 21.85 |
| 21 | −236.346 | 0.15 | | | 21.59 |
| 22 | 38.270 | 2.76 | 1.48749 | 70.2 | 21.10 |
| 23 | 221.722 | (variable) | | | 20.56 |
| 24 | −283.262 | 1.20 | 1.83400 | 37.2 | 19.57 |
| 25 | 60.127 | 4.70 | | | 19.27 |
| 26 | −118.989 | 1.66 | 1.77250 | 49.6 | 19.80 |
| 27 | 123.935 | 17.22 | | | 20.37 |
| 28 | −2022.837 | 3.52 | 1.69895 | 30.1 | 29.61 |
| 29 | −55.973 | | | | 30.08 |

Various data
Zoom ratio 3.70

| | Wide angle | Intermediate | Telephoto |
|---|---|---|---|
| Focal length | 105.41 | 200.00 | 390.00 |
| F NUMBER | 4.59 | 5.06 | 5.83 |
| Half angle of view (degree) | 11.60 | 6.17 | 3.18 |
| Image height | 21.64 | 21.64 | 21.64 |
| Lens overall length | 245.09 | 286.04 | 309.99 |
| BF | 79.92 | 82.58 | 113.95 |
| d5 | 15.15 | 56.15 | 80.15 |
| d10 | 43.41 | 25.73 | 1.50 |
| d19 | 7.68 | 21.24 | 15.63 |
| d23 | 2.58 | 4.00 | 2.41 |

Zoom lens unit data

| Unit | Starting surface | Focal length | Lens constitution length |
|---|---|---|---|
| 1 | 1 | 180.46 | 18.63 |
| 2 | 6 | −42.65 | 10.60 |
| 3 | 11 | 63.13 | 33.45 |
| 4 | 20 | 49.56 | 5.38 |
| 5 | 24 | −98.97 | 28.30 |

| Unit | Front side principal position | Rear side principal position |
|---|---|---|
| 1 | −1.82 | −14.02 |
| 2 | 5.13 | −2.20 |
| 3 | −21.45 | −31.52 |
| 4 | 0.88 | −2.66 |
| 5 | −24.59 | −69.05 |

TABLE 1

| | | Numerical example | | | | | |
|---|---|---|---|---|---|---|---|
| | | 1 | 2 | 3 | 4 | 5 | 6 |
| | Lens Unit | PNPNPNP | PNPPNP | PNPPNP | PNPNPNP | PNPNPNP | PNPPN |
| | Main focus Unit | L6(Fn) | L5(Fn) | L5(Fn) | L5(Fp) | L6(Fn) | L4(Fp) |
| | Floating Unit | L5(Fp) | L4(Fp) | L4(Fp) | L6(Fn) | L5(Fp) | L5(Fn) |
| | fw | 56.900 | 56.855 | 56.901 | 56.901 | 104.586 | 105.406 |
| | ft | 241.281 | 241.165 | 241.273 | 241.283 | 389.989 | 390.001 |
| | fLv | −25.887 | −24.889 | −26.260 | −26.317 | −41.504 | −42.650 |
| | fLp | 30.841 | 39.987 | 36.809 | 49.954 | 63.130 | |
| | fFp | 44.159 | 47.715 | 41.228 | 38.386 | 78.192 | 49.555 |
| | fFn | −34.641 | −35.211 | −25.831 | −26.288 | −62.312 | −98.970 |
| Condition (3) | βFpt | 0.312 | 0.359 | 0.359 | 0.281 | 0.360 | 0.098 |
| | Dfmw | 3.738 | 3.821 | 2.627 | −1.000 | 7.953 | −5.178 |
| | Dflw | 2.977 | 3.007 | 2.280 | −0.608 | 6.652 | −4.802 |
| | Dfmt | 7.000 | 7.000 | 5.000 | −5.847 | 11.000 | −4.872 |
| | Dflt | −5.599 | −6.993 | −3.436 | 2.636 | −9.348 | 6.740 |
| Condition (4) | Dfmw/Dflw | 1.256 | 1.271 | 1.152 | 1.643 | 1.196 | 1.078 |
| Condition (5) | Dfmt/Dflt | −1.250 | −1.001 | −1.455 | −2.218 | −1.177 | −0.723 |
| Condition (6) | fFp/fFn | 1.275 | 1.355 | 1.596 | 1.460 | 1.255 | 0.501 |
| Condition (7) | \|fLv/ft\| | 0.107 | 0.103 | 0.109 | 0.109 | 0.106 | 0.109 |

TABLE 1-continued

| | | Numerical example | | | | | |
|---|---|---|---|---|---|---|---|
| | | 1 | 2 | 3 | 4 | 5 | 6 |
| Condition (8) | fLp/ft | 0.128 | 0.166 | 0.153 | 0.130 | 0.128 | 0.162 |
| Condition (9) | fFp/ft | 0.183 | 0.198 | 0.171 | 0.159 | 0.200 | 0.127 |
| Condition (10) | \|fFn/ft\| | 0.144 | 0.146 | 0.107 | 0.109 | 0.160 | 0.254 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-256098, filed Nov. 22, 2012, which is hereby incorporated by reference herein in its entirety.

What is claimed is:

1. A zoom lens that includes a plurality of lens units having a negative refractive power and that changes a distance between adjacent lens units during zooming, the zoom lens comprising:
  a lens unit Lv positioned at the most object side of the plurality of lens units having the negative refractive power;
  a lens unit Lp positioned at the most object side of lens units having a positive refractive power, the lens units being positioned at an image side of the lens unit Lv;
  a lens unit Fp having a positive refractive power positioned at an image side of the lens unit Lp, the lens unit Fp being configured to move during focusing; and
  a lens unit Fn having a negative refractive power positioned at the image side of the lens unit Lp, the lens unit Fn being configured to move during focusing,
  wherein the lens unit Fp and the lens unit Fn move in the same direction in a first zoom range during focusing from infinity to minimum object distance, and
  wherein the lens unit Fp moves to an object side and the lens unit Fn moves to an image side in a second zoom range which is positioned at a telephoto side relative to the first zoom range during focusing from infinity to minimum object distance.

2. The zoom lens according to claim 1, wherein the following conditions are satisfied:

$$fw \leq fwa < (0.8 \times fw + 0.2 \times ft)$$

$$(0.8 \times fw + 0.2 \times ft) < fta \leq ft$$

where fw represents a focal length of an entire system at a wide angle end, ft represents a focal length of the entire system at a telephoto end, fwa represents a focal length of the entire system at a wide angle range, and fta represents a focal length of the entire system at a telephoto range,
  wherein the first zoom range is at least a part of the wide angle range, and
  wherein the second zoom range is at least a part of the telephoto range.

3. The zoom lens according to claim 1,
  wherein the lens unit Fp and the lens unit Fn move to an image side in the first zoom range during focusing from infinity to minimum object distance, and
  wherein the lens unit Fp moves to the object side and the lens unit Fn moves to the image side in the second zoom range during focusing from infinity to minimum object distance.

4. The zoom lens according to claim 1, wherein in order from an object side to an image side, the lens unit Fp and the lens unit Fn are arranged.

5. The zoom lens according to claim 1, wherein the following condition is satisfied:

$$-0.5 < \beta Fpt < 0.8$$

where βFpt represents a lateral magnification of the lens unit Fp at a telephoto end.

6. The zoom lens according to claim 1,
  wherein a main focus unit is a lens unit which has the same moving direction when focusing from infinity to minimum object distance in the first zoom range and the second zoom range of the lens unit Fp and the lens unit Fn,
  wherein a floating unit is a lens unit which has the different moving direction when focusing from infinity to minimum object distance in the first zoom range and the second zoom range of the lens unit Fp and the lens unit Fn, and
  wherein the following condition is satisfied:

$$0.8 < Dfmw/Dflw < 2.0$$

where Dfmw represents a movement amount of the main focus unit when focusing from infinity to minimum object distance at a wide angle end and Dflw represents a movement amount of the floating unit when focusing from infinity to minimum object distance at the wide angle end.

7. The zoom lens according to claim 1,
  wherein a main focus unit is a lens unit which has the same moving direction when focusing from infinity to minimum object distance in the first zoom range and the second zoom range of the lens unit Fp and the lens unit Fn,
  wherein a floating unit is a lens unit which has the different moving direction when focusing from infinity to minimum object distance in the first zoom range and the second zoom range of the lens unit Fp and the lens unit Fn, and
  wherein the following condition is satisfied:

$$-4.00 < Dfmt/Dflt < -0.25$$

where Dfmt represents a movement amount of the main focus unit when focusing from infinity to minimum object distance at a telephoto end and Dflt represents a movement amount of the floating unit when focusing from infinity to minimum object distance at the telephoto end.

8. The zoom lens according to claim 1, wherein the following condition is satisfied:

$$0.3 < |fFp/fFn| < 3.0$$

where fFp represents a focal length of the lens unit Fp and fFn represents a focal length of the lens unit Fn.

9. The zoom lens according to claim 1, wherein the lens unit Fp and the lens unit Fn only move during focusing.

10. The zoom lens according to claim 1, wherein the lens unit Fn moves during zooming.

11. The zoom lens according to claim 1, wherein the lens unit Fn moves to the object side during zooming from a wide angle end to a telephoto end.

12. The zoom lens according to claim 1, wherein the lens unit Fp moves to the object side during zooming from a wide angle end to a telephoto end.

13. The zoom lens according to claim 1, wherein the lens unit Fn has not more than two lenses.

14. The zoom lens according to claim 1, wherein the lens unit Fp has not more than two lenses.

15. The zoom lens according to claim 1, the zoom lens comprising:
   in order from the object side to the image side,
      a first lens unit having a positive refractive power;
      a second lens unit having a negative refractive power;
      a third lens unit having a positive refractive power;
      a fourth lens unit having a positive refractive power;
      a fifth lens unit having a negative refractive power; and
      a sixth lens unit having a positive refractive power;
      wherein the lens unit Fp is the fourth lens unit, and
      wherein the lens unit Fn is the fifth lens unit.

16. The zoom lens according to claim 1, the zoom lens comprising:
   in order from the object side to the image side,
      a first lens unit having a positive refractive power;
      a second lens unit having a negative refractive power;
      a third lens unit having a positive refractive power;
      a fourth lens unit having a negative refractive power;
      a fifth lens unit having a positive refractive power;
      a sixth lens unit having a negative refractive power; and
      a seventh lens unit having a positive refractive power;
      wherein the lens unit Fp is the fifth lens unit, and
      wherein the lens unit Fn is the sixth lens unit.

17. The zoom lens according to claim 1, the zoom lens comprising:
   in order from the object side to the image side,
      a first lens unit having a positive refractive power;
      a second lens unit having a negative refractive power;
      a third lens unit having a positive refractive power;
      a fourth lens unit having a positive refractive power; and
      a fifth lens unit having a negative refractive power; and
      wherein the lens unit Fp is the fourth lens unit, and
      wherein the lens unit Fn is the fifth lens unit.

18. The zoom lens according to claim 1, wherein the following conditions are satisfied:

$$0.05 < |fLv/ft| < 0.20$$

$$0.06 < fLp/ft < 0.25$$

$$0.08 < fFp/ft < 0.30$$

$$0.05 < |fFn/ft| < 0.40$$

where fLv represents a focal length of the lens unit Lv, fLp represents a focal length of the lens unit Lp, fFp represents a focal length of the lens unit Fp, fFn represents a focal length of the lens unit Fn and ft represents a focal length of an entire system at a telephoto end.

19. An image pickup apparatus comprising:
   a zoom lens that includes a plurality of lens units having a negative refractive power and that changes a distance between adjacent lens unit during zooming; and
   a photoelectric conversion element configured to receive an image formed by the zoom lens,
   wherein the zoom lens comprising:
   a lens unit Lv positioned at the most object side of the plurality of lens units having the negative refractive power;
   a lens unit Lp positioned at the most object side of lens units that has a positive refractive power, the lens units being positioned at an image side of the lens unit Lv;
   a lens unit Fp having a positive refractive power positioned at an image side of the lens unit Lp, the lens unit Fp being configured to move during focusing; and
   a lens unit Fn having a negative refractive power positioned at an image side of the lens unit Lp, the lens unit Fn being configured to move during focusing,
   wherein the lens unit Fp and the lens unit Fn move in the same direction in a first zoom range during focusing from infinity to minimum object distance, and
   wherein the lens unit Fp moves to an object side and the lens unit Fn moves to an image side in a second zoom range which is positioned at a telephoto side relative to the first zoom range during focusing from infinity to minimum object distance.

* * * * *